(12) United States Patent
Purks et al.

(10) Patent No.: US 9,315,146 B2
(45) Date of Patent: Apr. 19, 2016

(54) VEHICLE TURN SIGNALLING APPARATUSES WITH LASER DEVICES, LIGHT PROJECTION CIRCUITS, AND RELATED ELECTROMECHANICAL ACTUATORS

(71) Applicants: Kory Patrick Purks, Cary, NC (US); Bryce Benjamin Purks, Cary, NC (US); Connor Kent Purks, Cary, NC (US)

(72) Inventors: Kory Patrick Purks, Cary, NC (US); Bryce Benjamin Purks, Cary, NC (US); Connor Kent Purks, Cary, NC (US)

(*) Notice: Subject to any disclaimer, the term of this patent is extended or adjusted under 35 U.S.C. 154(b) by 201 days.

(21) Appl. No.: 13/972,074

(22) Filed: Aug. 21, 2013

(65) Prior Publication Data
US 2013/0335212 A1     Dec. 19, 2013

Related U.S. Application Data

(63) Continuation-in-part of application No. 12/798,900, filed on Apr. 13, 2010, now Pat. No. 8,531,285.

(51) Int. Cl.
*B60Q 1/34* (2006.01)
*B60Q 1/38* (2006.01)

(52) U.S. Cl.
CPC .. *B60Q 1/34* (2013.01); *B60Q 1/38* (2013.01); *B60Q 2400/50* (2013.01)

(58) Field of Classification Search
CPC .......... B60Q 1/34; B60Q 1/38; B60Q 2400/50
USPC ................................. 340/435, 465, 466, 475
See application file for complete search history.

(56) References Cited

U.S. PATENT DOCUMENTS

| | | | | |
|---|---|---|---|---|
| 6,016,035 A * | 1/2000 | Eberspacher et al. | ........... | 315/82 |
| 6,422,728 B1 * | 7/2002 | Riggin | ........... | 362/540 |
| 2003/0147247 A1 * | 8/2003 | Koike | ........... | 362/464 |
| 2004/0218401 A1 * | 11/2004 | Okubo et al. | ........... | 362/526 |
| 2005/0017858 A1 * | 1/2005 | Gross | ........... | 340/435 |
| 2005/0117364 A1 * | 6/2005 | Rennick et al. | ........... | 362/540 |
| 2007/0280503 A1 * | 12/2007 | Kubota et al. | ........... | 382/103 |
| 2009/0187307 A1 * | 7/2009 | Imaeda et al. | ........... | 701/36 |
| 2010/0079072 A1 * | 4/2010 | Sakaguchi | ........... | 315/77 |

* cited by examiner

*Primary Examiner* — Fekadeselassie Girma
*Assistant Examiner* — Stephen Burgdorf
(74) *Attorney, Agent, or Firm* — David K. Purks

(57) ABSTRACT

A vehicle turn signaling apparatus includes a light source that is powered by a turn signal circuit of the vehicle. The light source is configured to project a low divergence visible line onto a driving lane adjacent to the vehicle in response to activation of the turn signal circuit to visibly warn other drivers where a driver of the vehicle may intend to move the vehicle.

23 Claims, 10 Drawing Sheets

VEHICLE TURN SIGNALLING APPARATUSES WITH LASER DEVICES, LIGHT PROJECTION CIRCUITS, AND RELATED ELECTROMECHANICAL ACTUATORS

CROSS REFERENCE TO RELATED APPLICATION

The present application claims the benefit of priority as a continuation-in-part application from U.S. patent application Ser. No. 12/798,900 filed Apr. 13, 2010, entitled "VEHICLE TURN SIGNALING APPARATUS THAT PROJECTS A LOW DIVERGENCE LINE ONTO AN ADJACENT DRIVING LANE," the disclosure of which is hereby incorporated herein in its entirety by reference.

FIELD OF THE INVENTION

This invention relates to vehicle lighting, and more particularly to apparatuses for signaling vehicle turns.

BACKGROUND OF THE INVENTION

The development of vehicle turn signals made driving significantly safer. National governments responded by mandating that all road vehicles include standardized turn signal lighting on the front and rear vehicle surfaces. However, turn signals are not always effective at warning other drivers.

The high occurrence of essentially identical signaling has resulted in many drivers becoming essential blind thereto. The location of the turn signals on a vehicle body is also signaling occurring in the peripheral vision of drivers in adjacent lanes, and the signaling may be visually blocked by front and side window pillars that support the vehicle roof structure. Moreover, when turn signals are observed by other drivers, they sometimes do not trigger a conscious reaction in some driving situations. Some manufacturers have attempted to address some limitations of existing turn signaling lighting by adding turn signal lighting to side view mirrors. However, such additional lighting still doesn't adequately address these and other limitations of existing turn signal lighting.

Consequently, there continues to be a tremendous need for further innovation in vehicle turn signal lighting that can address at least some of these known limitations while providing an aesthetically pleasing feature that will be sought by consumers.

SUMMARY OF THE INVENTION

As explained above, the effectiveness of conventional turn signal lighting is limited by its appearance in the peripheral vision of drivers in adjacent roadway lanes and commonality. Various embodiments of the present invention may overcome these and other limitations by configuring a vehicle so that turn signal lighting is projected onto an adjacent lane to the vehicle. The visual effectiveness and aesthetics of the turn signal lighting is dramatically enhanced by using one or more light sources that are configured to project a low divergence visible line that provides a well defined attention grabbing pattern on an adjacent lane Some embodiments of the present invention provide a vehicle turn signaling apparatus that includes a light source that is powered by a turn signal circuit of the vehicle. The light source is configured to project a low divergence visible line onto an adjacent driving lane to the vehicle in response to activation of the turn signal circuit to visibly warn other drivers where a driver of the vehicle can intend to move the vehicle.

Apparatuses according to other embodiments of the invention will be or become apparent to one of skill, in the art upon review of the following drawings and Detailed Description. It is intended that all such additional apparatus be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION

Figure 1:
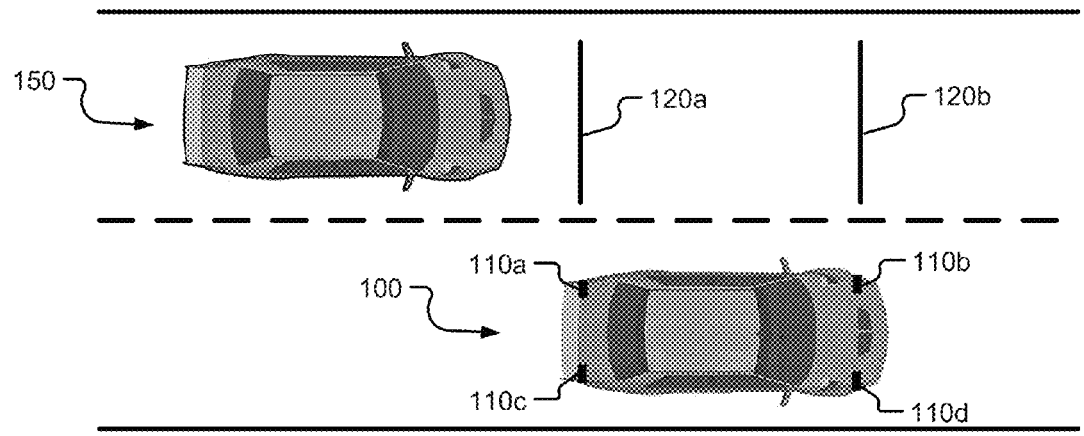
FIG. 1 is a top view of a vehicle that includes a turn signal circuit that is configured in accordance with some embodiments of the present invention to project a low divergence visible line onto an adjacent driving lane to visibly warn other drivers where the driver may change lanes.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As explained above, the effectiveness of conventional turn signal lighting is limited by its appearance in the peripheral vision of drivers in adjacent roadway lanes and commonality. Various embodiments of the present invention may overcome these and other limitations by configuring a vehicle so that turn signal lighting is projected onto an adjacent lane to the vehicle. The visual effectiveness and aesthetics of the turn signal lighting is dramatically enhanced by using one or more light sources that are configured to project a low divergence visible line that provides a well defined attention grabbing pattern on an adjacent lane.

Accordingly, in some embodiments, a vehicle turn signaling apparatus includes a light source that is powered by a turn signal circuit of the vehicle. The light source is configured to project a low divergence visible line onto a driving lane that is adjacent to the vehicle in response to activation of the turn signal circuit so as to visibly warn other drivers where a driver of the vehicle is intending to move the vehicle.

As used herein, the term "line" includes linear and non-linear continuous and segmented (i.e., dashed) areas on a road surface that are defined by illumination from a light source. Although various lines have been illustrated in FIGS. 1-8 as being solid (continuous) for ease of illustration, one or more of them may instead be segmented (i.e., dashed). Various turn signaling circuitry (e.g., the various circuit embodiments described herein) may be configured to generate the lines so that they may be flashed on and off to increase their attention grabbing capability and/or aesthetics of the lines projected onto the adjacent roadway lane.

When the lines are segmented/dashed, individual segments along a line may be sequentially illuminated to extend the line from a defined starting point to a spaced apart ending point over a time period that is selected to increase the likelihood that the signaling is noticed by an adjacent driver and/or to further increase the aesthetics of the signaling (e.g., a time period of between 0.1 sec to 1 sec). The rate of flashing of individual entire lines and/or line segments projected onto an adjacent lane may be selected to be faster (e.g., at least 1.5 times faster) than the flashing rate of other turn signal lighting on the vehicle to increase the likelihood that the signaling is noticed by an adjacent driver (who may have become less observant of slow flashing conventional turn signaling lighting) and/or to further increase the aesthetics of the signaling.

In some embodiments, as segments along the line are illuminated, the turn signaling circuitry (e.g., various embodiments described herein) may be configured to maintain those segments illuminated until all segments along the line are illuminated and after which all of those segments are then turned off before the process is repeated, or vice versa all segments along a line may cycle on and then be sequentially cycled off until all segments are turned off before the process is repeated. Illuminating more segments can increase the observability of the projected lines during daylight hours. In some other embodiments, an alternating pattern of illuminated and non-illuminated segments of a line may sequentially move across a line to visually create an illusion that the pattern is moving toward/away the vehicle and/or in the direction of travel/opposite to the direction of travel of the vehicle. In some other embodiments, the line segments may be logically grouped into two or more groups, and the turn signaling circuitry may be configured to cycle through illuminating/non-illuminating different sequential groups of line segments while the other groups of line segments remain non-illuminated/illuminated.

The flashing rate of entire lines and/or line segments may be decreased during daylight hours and increased during nighttime house, and/or the number of line segments that are simultaneously illuminated may be increased during daylight hours and decreased during nighttime hours to control the luminosity of the projected signaling and, thereby, the observability of the projected lighting dependent upon the sensed or expected ambient lighting. Thus, in some embodiments, the turn signaling circuitry may include an ambient light sensor that is configured to sense the ambient lighting and/or a time of day clock the is used to predict the expected ambient lighting, where the output of the sensor and/or clock is used by the circuitry (e.g., a sequencer circuit or other circuit) to regulate the flashing rate and/or number of segments along a line that are simultaneously illuminated.

The term "low divergence" refers to the beam divergence of light that is projected from the light source and, relatedly, the change in thickness of the line that is projected onto the adjacent roadway lane with distance from the light source. In some embodiments the light source includes a laser device that generates a coherent wavelength beam that can be focused (such as by a single lens) to project a relatively constant width line at a typical distance from the light source on a vehicle in one lane to a distant point in an adjacent driving lane. An example distance may, for example, be about 15 feet for a 12 foot driving lane when the light source is located an additional 3 feet away in an adjacent lane.

In some other embodiments, the light source includes a light emitting diode that outputs a majority of its light within a relatively narrow frequency range that can be sufficiently focused using one or more lenses to project at least a majority of its light output power (intensity) within a low divergent pathway that forms a low divergent width line at the typical distance from the light source on a vehicle in one lane to a distant point in an adjacent driving lane.

For example, in some exemplary embodiments, a low divergence line may be projected by a laser light source and/or a light emitting diode light source by focusing a majority of its light output power from the narrow beam width exiting the light source (e.g., less than about 0.5 inches, or more preferable less than about 3/16th inches, or even more preferable less than about 1/16th inches) into a line that increases in width less than about a six inches as it extends across at least a majority of the roadway driving lane (e.g., a 12 foot width lane) that is adjacent to the vehicle in which the light source is embodied. Because the illuminated portion of the adjacent lane may also be illuminated by the Sun, street lighting, and/or the headlights of another vehicle that is following in the same lane or in the adjacent lane to the vehicle, it can be important to increase the intensity of the line that is projected onto the adjacent lane by focusing at a least a majority of the light output power of the light source into a much more narrowly divergent line. Through testing it has been determined that projecting the light beam into a line that increases in width less than about 1 inch from the beam at the light source to at a point about halfway across an adjacent roadway lane (e.g., 6 feet for a 12 foot width lane) may enable the light beam to viewable by another nearby driver while that part of the lane is also illuminated by a more distant headlight on a trailing vehicle. Moreover, through further testing it has been it has been determined that projecting the light beam into a line that increases in width less than about 1/4 inch from the beam at the light source to a point about halfway across an adjacent roadway lane may enable the light beam to viewable by another nearby driver while the lane is also illuminated by a rising/setting Sun. Moreover, through further testing it has been determined that projecting the light beam into a line that increases in width less than about 1/8 inch from the beam at the light source to a point about halfway across an adjacent roadway lane may enable the light beam to be viewable by another nearby driver while the lane is also illuminated by the Sun shining through moderate cloud cover. It will be appreciated that a higher intensity light source will increase the viewability of the projected line by another nearby driver and can enable the line that is projected onto an adjacent roadway to be viewable by an adjacent driver during fully sunshine.

As will be explained below, a plurality of vehicle turn signaling apparatuses may be connected to a vehicle to project a plurality of lines that may form a static or dynamically changing pattern onto a driving lane that is adjacent to the vehicle. It is to be understood that the invention is not limited to these exemplary embodiments, but, instead, covers all configurations within the claims appended hereto and all equivalents thereto.

FIG. 1 is a top view of two automotive vehicles 100 and 150 that are located in adjacent driving roadway lanes. The invention is not limited to use in automobiles, because it may be incorporated into motorcycles and other types of vehicles to provide improved vehicle turn signaling. The vehicle 100 includes four light sources 110a-d that are located at different corner regions of the vehicle 100. For example, light sources 110b and 100d may be connected to opposite sides of a front bumper of the vehicle 100 and light sources 100a and 100c may be connected to opposite sides of a rear bumper of the vehicle 100. FIG. 1 further illustrates a pair of low divergence visible lines 120a and 120b that are projected by the light sources 110a and 100b onto the adjacent driving lane in response to a driver activating a turn signal circuit to warn another driver of vehicle 150 of the driver's intention to change lanes in that direction. The other light sources 110c and 110d can similarly project a pair of low divergence visible lines onto an opposite driving lane that is adjacent to those light sources in response to driver activating the turn signal circuit to signal the driver's intention to change lines in that direction.

Figure 2:
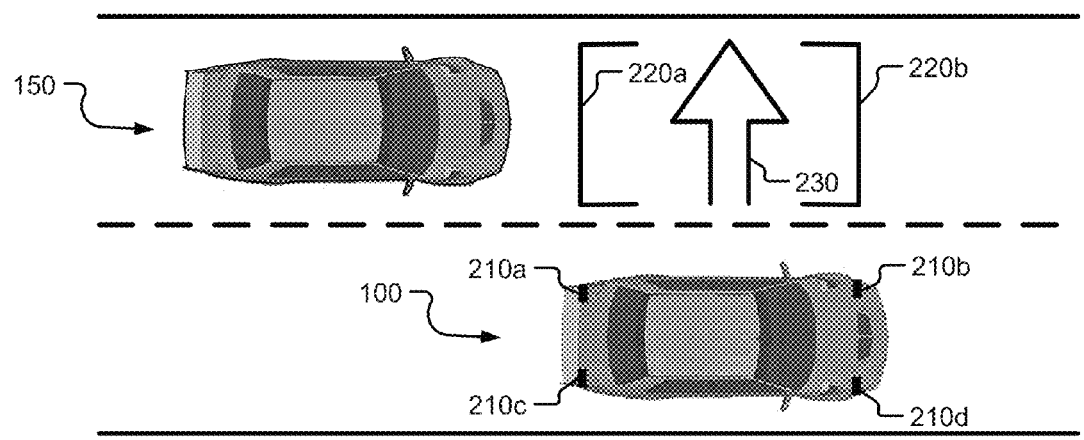
FIG. 2 is a top view of a vehicle that includes a turn signal circuit that is configured in accordance with some other embodiments of the present invention to project more complex low divergence visible lines and/or symbols onto an adjacent driving line to visibly warn other drivers where the driver may change lanes.

FIG. 2 is another top view of the vehicles 100 and 150, but where vehicle 100 is configured to project more complex lines and/or symbols onto adjacent driving lanes. The vehicle 100 includes four light sources 210a-d that are located at exemplary corner regions of the vehicle 100. One or both of the light sources on a same side of the vehicle 100 can be configured to project more complex low divergence visible lines, such as the illustrated bracket-shaped lines 220a-200b, and/or to project another visible symbol, such the arrow symbol 230, onto the adjacent lane in response to a driver activating a turn signal circuit to warn another driver of vehicle 150 of the driver's intention to change lines in that direction.

For example, light source 210a may be configured to project the low divergence bracket-shaped line 220a onto the adjacent lane by passing the light beam from the light source 210a through corresponding shaped bracket shaped filter element(s). The light source 210b may be similarly configured to project the low divergence bracket-shaped line 220b onto the adjacent lane. The combination of light sources 210a-b and/or one or more other light sources may be configured to project the arrow symbol 230. The light sources 210c and 210d can similarly project the same or different low divergence lines and/or shapes as projected by light sources 210a-b onto another driving lane that is adjacent to those light sources in response to the driver activating the turn signal circuit to signal the driver's intention to change lines in that direction.

Figure 3:
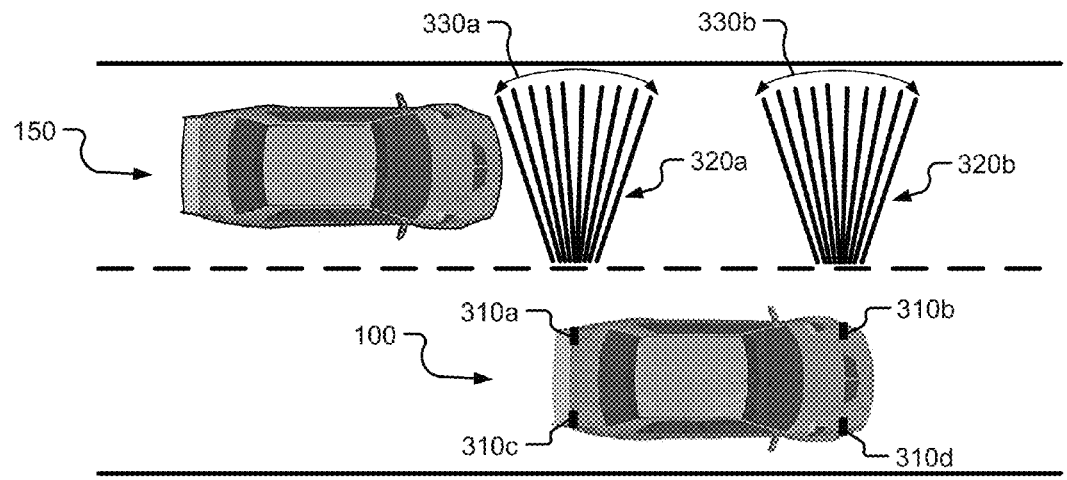
FIG. 3 is a top view of a vehicle that includes a turn signal circuit that is configured in accordance with some other embodiments of the present invention to project patterns of low divergence visible lines that may be controlled to dynamically sweep along the adjacent driving lane to visibly warn other drivers where the driver may change lanes.

FIG. 3 is another top view of the vehicles 100 and 150, where vehicle 100 is configured to project another pattern of lines that may be controlled to dynamically sweep along the adjacent driving lane. The vehicle 100 includes four light sources 310a-d that are located at different exemplary corner regions of the vehicle 100. One or both of the light sources on a same side of the vehicle 100 can be configured to project a plurality of spaced apart low divergence lines, such as the illustrated line patterns 320a and 320b, that extend at least partially across, and may extend entirely across, the adjacent lane in response to a driver activating a turn signal circuit to warn another driver of vehicle 150 of the driver's intention to change lanes in that direction. All of the lines within each pattern 320a and 320b may be illuminated at the same time or they may be illuminated one at a time to provide a sequence of lines that appear to repetitively angularly sweep forward (e.g., in the direction of travel of vehicle 150) and/or backward (e.g., opposite to the direction of travel of vehicle 150) along the adjacent lane, such as illustrated by the bidirectional arrow's 330a and 330b.

Accordingly, the projected line pattern in the adjacent lane may repetitively sweep forward and backwards. Alternatively or additionally, the light sources 310a-d may be turned on and off to cause the projected light pattern to flash. The rate of flashing may be higher than the rate of flashing of other turn signal lighting on the vehicle 100 to be further distinctive and grab the attention of other drivers and/or to provide improved and desirable aesthetics. Moreover, the rate of flashing may be configured to change over time so as to be substantially aperiodic, which may be further attention grabbing in contrast to the relatively slow periodic flashing that drivers are accustomed to seeing on conventional turn signal lighting.

The other light sources 310c and 310d can be configured to project similar patterns of lines 320a and 320b as projected by light sources 310a-b onto an opposite driving lane that is adjacent to those light sources in response to driver activating the turn signal circuit to signal the driver's intention to change lines in that direction.

Figure 4:
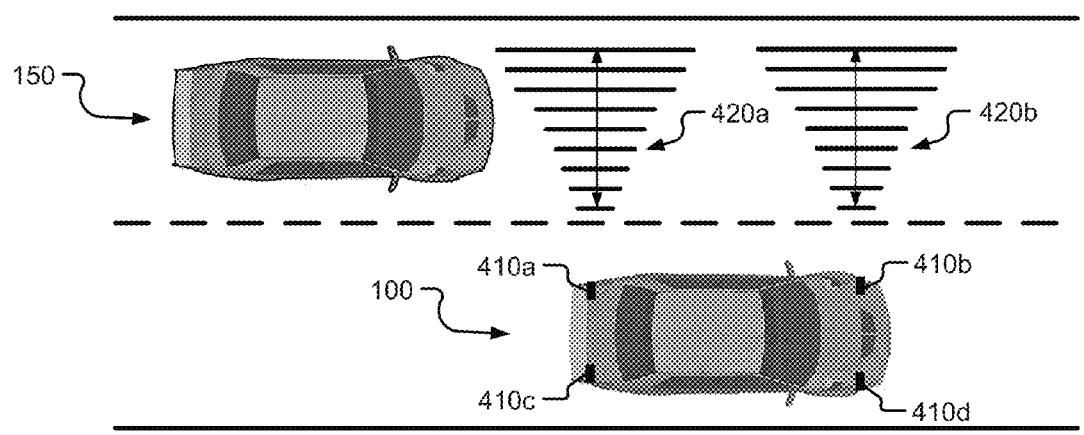
FIG. 4 is a top view of a vehicle that includes a turn signal circuit that is configured in accordance with some other embodiments of the present invention to project patterns of low divergence visible lines that may be controlled to dynamically sweep across the adjacent driving lane to visibly warn other drivers where the driver may change lanes.

FIG. 4 is another top view of the vehicles 100 and 150, but where vehicle 100 is configured to project another pattern of lines that may be controlled to dynamically sweep across the adjacent driving lane. The vehicle 100 includes four light sources 410a-d that are located at different corner regions of the vehicle 100. In contrast to the light sources 310a-d of FIG. 3, the present light sources 410a-d are configured to project a plurality of spaced apart low divergence lines, such as the illustrated line patterns 420a and 420b, that extend along the adjacent lane (in the direction of travel of the vehicle 100) in response to a driver activating a turn signal circuit to warn of the driver's intention to change lanes in that direction. All of the lines within each pattern 420a and 420b may be illuminated at the same time or they may be illuminated one at a time to provide a sequence of lines that appear to tentatively sweep away from and/or toward the vehicle 100, such as illustrated by the bidirectional arrow's extending through the patterns 420a and 420b.

Accordingly, the projected line pattern in the adjacent lane may repetitively sweep away from and/or toward the vehicle 100. Alternatively or additionally, the light sources 410a-d may be turned on and off to cause the projected light pattern to flash. The rate of flashing may be higher than the rate of flashing of other turn signal lighting on the vehicle 100 to be further distinctive and grab the attention of other drivers and/or to provide improved and desirable aesthetics. Moreover, the rate of flashing may be configured to change over time so as to be substantially aperiodic, which may be further attention grabbing in contrast to the relatively slow periodic flashing that drivers are accustomed to seeing on conventional turn signal lighting.

The other light sources 410c and 410d can be configured to project similar patterns of lines 420a and 420b as projected by light sources 410a-b onto an opposite driving lane that is adjacent to those light sources in response to driver activating the turn signal circuit to signal the driver's intention to change lines in that direction.

Figure 5:
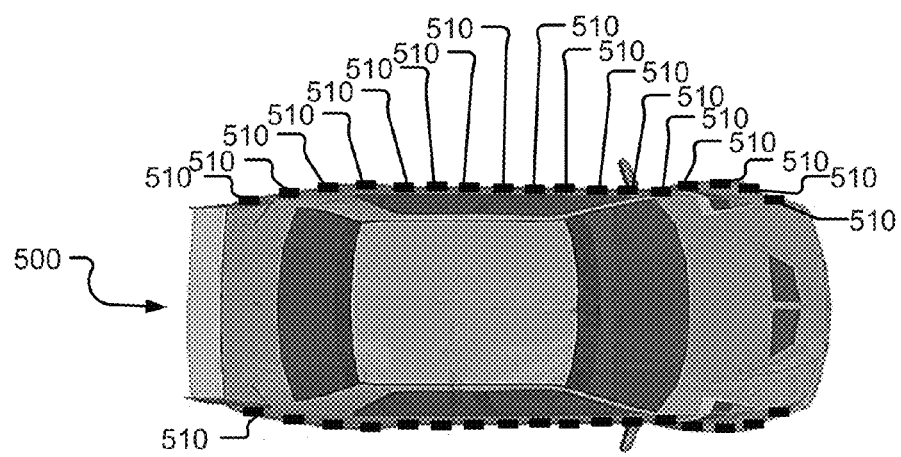
FIGS. 5 and 6 are top views of a vehicle that includes a plurality of light sources that are spaced part along each side of the vehicle to project patterns of low divergence visible lines in accordance with some other embodiments of the present invention.
Figure 6:
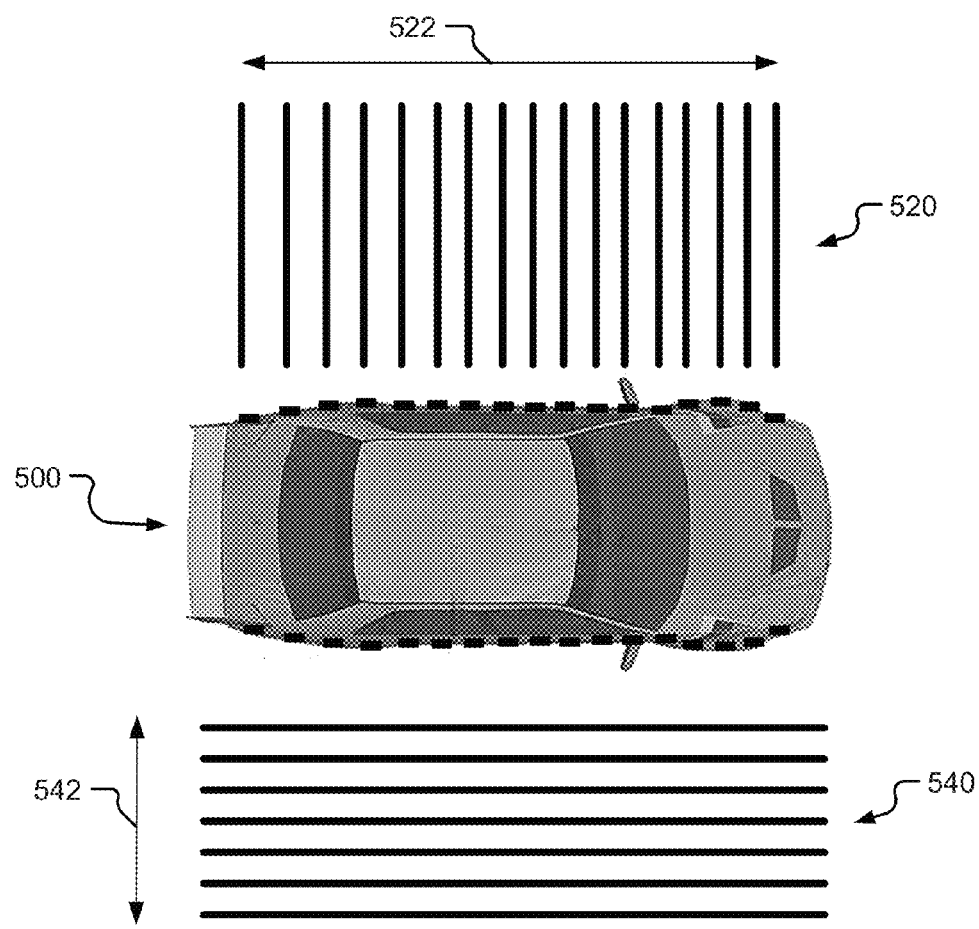

FIGS. 5 and 6 are top views of another vehicle 500 that includes a plurality of light sources 510 that are spaced apart along opposite sides of the vehicle 500. Referring to FIG. 5, the exemplary vehicle 500 may include 17 light sources 510 that are spaced apart along each side of the vehicle, although any plural number of the light sources 510 may be used. The light sources 510 may be at least partially disposed within a bottom portion of the vehicle body, such in a bottom portion of the front and rear bumpers and below door openings that provide access to a passenger compartment of the vehicle 500. Alternatively or additionally, the light sources 510 may be at least partially disposed within running boards that extend along and are connected to a lower portion (e.g., underside frame) of the vehicle 500.

Referring to FIG. 6, each of the light sources 510 may be configured to project a low divergence line that extends at least partially across the adjacent lane. Accordingly, the light sources 510 can collectively project a plurality of low divergence lines that form a pattern 520 that extend away from the vehicle 500. All of the light sources 510 on the same side of vehicle may be simultaneously activated to project all of the lines within the pattern 520 in response to a driver activating the turn signal circuit to signal a driver's intention to change lanes in that direction. Alternatively, the light sources 510 may be sequentially activated to provide a sequence of lines that appear to repetitively sweep forward (e.g., in the direction of travel of vehicle 500) and/or backward (e.g., opposite to the direction of travel of vehicle 500) along the adjacent lane, such as illustrated by the bidirectional arrow 522. More than one of the light sources 510 on the same side of the vehicle may be simultaneously activated to provide more than one sequence of lines that appear to sweep forward and/or backward in the pattern 520, such as by providing one sequence of lines that appear to sweep from the front to the back of the pattern 520 while simultaneously providing another sequence of lines that appear to sweep from the back to the front of the pattern 520.

Accordingly, the projected line pattern in the adjacent lane may repetitively sweep in various defined directions. Alternatively or additionally, the light sources 510 may be turned on and off to cause the projected light pattern to flash. The rate of flashing may be higher than the rate of flashing of other turn signal lighting on the vehicle 500 to be further distinctive and grab the attention of other drivers and/or to provide improved and desirable aesthetics. Moreover, the rate of flashing may be configured to change over time so as to be substantially aperiodic, which may be further attention grabbing in contrast to the relatively slow periodic flashing that drivers are accustomed to seeing on conventional turn signal lighting.

The light sources 510 on the opposite side of vehicle 500 can be configured to project a similar pattern 520 of low divergence lines onto a driving lane that is adjacent to those light sources in response to driver activating the turn signal circuit to signal the driver's intention to change lines in that direction.

With continued reference to FIG. 6, in some other embodiments each of the light sources 510 may be configured to project a low divergence line that extends along the adjacent lane (in the direction of travel of the vehicle 500). Accordingly, the light sources 510 can collectively project a plurality of low divergence lines to form another pattern 540 of lines that extends parallel to or at a defined angle from the vehicle 500 and are spaced apart in a direction away from the vehicle 500.

All of the light sources 510 on the same side of vehicle may be simultaneously activated to project all of the lines within the pattern 540 in response to a driver activating the turn signal circuit signal a driver's intention to change lanes in that direction. Alternatively, the light sources 510 may be sequentially activated to provide a sequence of lines that appear to sweep away from and/or toward the vehicle 500 (e.g., back and forth away and toward the vehicle 500), such as illustrated by the bidirectional arrow 542. More than one of the light sources 510 on the same side of the vehicle may be simultaneously activated to provide more than one sequence of lines that appear to sweep away and/or toward the vehicle 500, such as by providing one sequence of lines that appear to sweep away from the vehicle 500 while simultaneously providing another sequence of lines that appear to sweep toward the vehicle 500. The light sources 510 on the opposite side of vehicle 500 can be configured to project a similar pattern of lines 540 onto an driving lane that is adjacent to those light sources in response to driver activating the turn signal circuit to signal the driver's intention to change lines in that direction.

Figure 7:
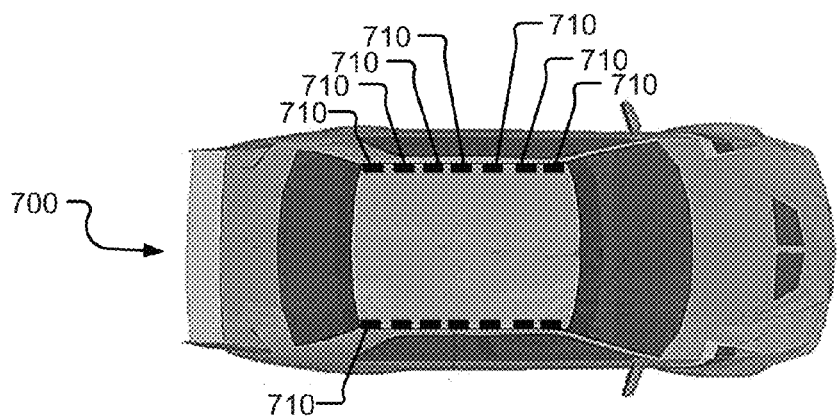
FIGS. 7 and 8 are top views of a vehicle that includes a plurality of light sources that are spaced part along each side of the vehicle to project other patterns of low divergence visible lines in accordance with some other embodiments of the present invention.
Figure 8:
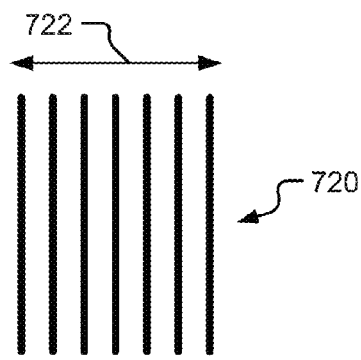
Figure 8:
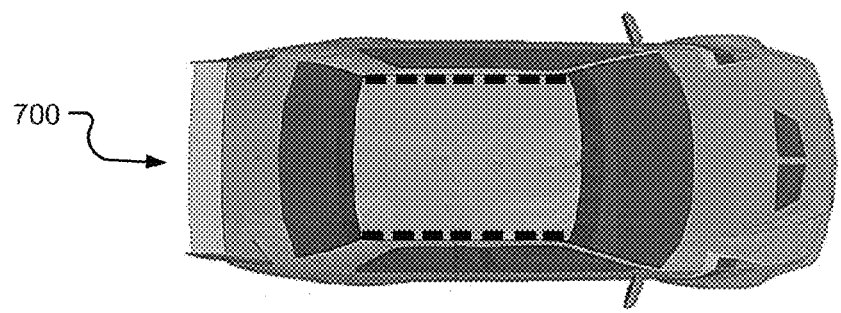
Figure 8:

FIGS. 7 and 8 are top views of another vehicle 700 that includes a plurality of light sources 710 that are spaced apart along opposite sides of the vehicle 700. Referring to FIG. 7, the exemplary vehicle 700 may include seven light sources 710 that are spaced apart along an upper surface of each side of the vehicle, although any plural number of the light sources 710 may be used. The light sources 710 may be at least partially disposed within a roof rack on the vehicle 700 and angled downward to collectively project a continuous or segmented low divergence line to project a plurality of low divergence lines onto the adjacent driving lane.

Referring to FIG. 8, each of the light sources 710 may be configured to project a low divergence line that extends at least partially across the adjacent lane. Accordingly, the light sources 710 can collectively project a plurality of lines that form a pattern 720 that extend away from the vehicle 700. All of the light sources 710 on the same side of vehicle may be simultaneously activated to project all of the lines within the pattern 720 in response to a driver activating the turn signal circuit signal a driver's intention to change lanes in that direction. Alternatively, the light sources 710 may be sequentially activated to provide a sequence of lines that appear to repetitively sweep forward (e.g., in the direction of travel of vehicle 700) and/or backward (e.g., opposite to the direction of travel of vehicle 700) along the adjacent lane, such as illustrated by the bidirectional arrow 722.

More than one of the light sources 710 on the same side of the vehicle may be simultaneously activated to provide more than one sequence of lines that appear to sweep forward and/or backward in the pattern 720 at the same time, such as by providing one sequence of lines that appear to sweep from the front to the back of the pattern 720 while simultaneously providing another sequence of lines that appear to sweep from the back to the front of the pattern 720. The light sources 710 on the opposite side of vehicle 700 can be configured to project a similar pattern of lines 720 onto an driving lane that is adjacent to those light sources in response to driver activating the turn signal circuit to signal the driver's intention to change lines in that direction.

Alternatively or additionally, the light sources 710 may be turned on and off to cause the projected light pattern to flash. The rate of flashing may be higher than the rate of flashing of other turn signal lighting on the vehicle 700 to be further distinctive and grab the attention of other drivers and/or to provide improved and desirable aesthetics. Moreover, the rate of flashing may be configured to change over time so as to be substantially aperiodic, which may be further attention grabbing in contrast to the relatively slow periodic flashing that drivers are accustomed to seeing on conventional turn signal lighting.

With continued reference to FIG. 8, in some other embodiments each of the light sources 710 may be configured to project a line that extends along the adjacent lane (in the direction of travel of the vehicle 700). Accordingly, the light sources 710 can collectively project a plurality of lines to form another pattern 740 of lines that extends parallel to or at a defined angle from the vehicle 700 and are spaced apart in a direction away from the vehicle 700. All of the light sources 710 on the same side of vehicle may be simultaneously activated to project all of the lines within the pattern 740 in response to a driver activating the turn signal circuit signal a driver's intention to change lanes in that direction. Alternatively, the light sources 710 may be sequentially activated to provide a sequence of lines that appear to repetitively sweep away from and/or toward the vehicle 700 (e.g., back and forth away and toward the vehicle 700), such as illustrated by the bidirectional arrow 742. More than one of the light sources 710 on the same side of the vehicle may be simultaneously activated to provide more than one sequence of lines that appear to sweep away and/or toward the vehicle 700, such as by providing one sequence of lines that appear to sweep away from the vehicle 700 while simultaneously providing another sequence of lines that appear to sweep toward the vehicle 700. The light sources 710 on the opposite side of vehicle 700 can be configured to project a similar pattern of lines 740 onto an driving lane that is adjacent to those light sources in response to driver activating the turn signal circuit to signal the driver's intention to change lines in that direction.

Figure 9:
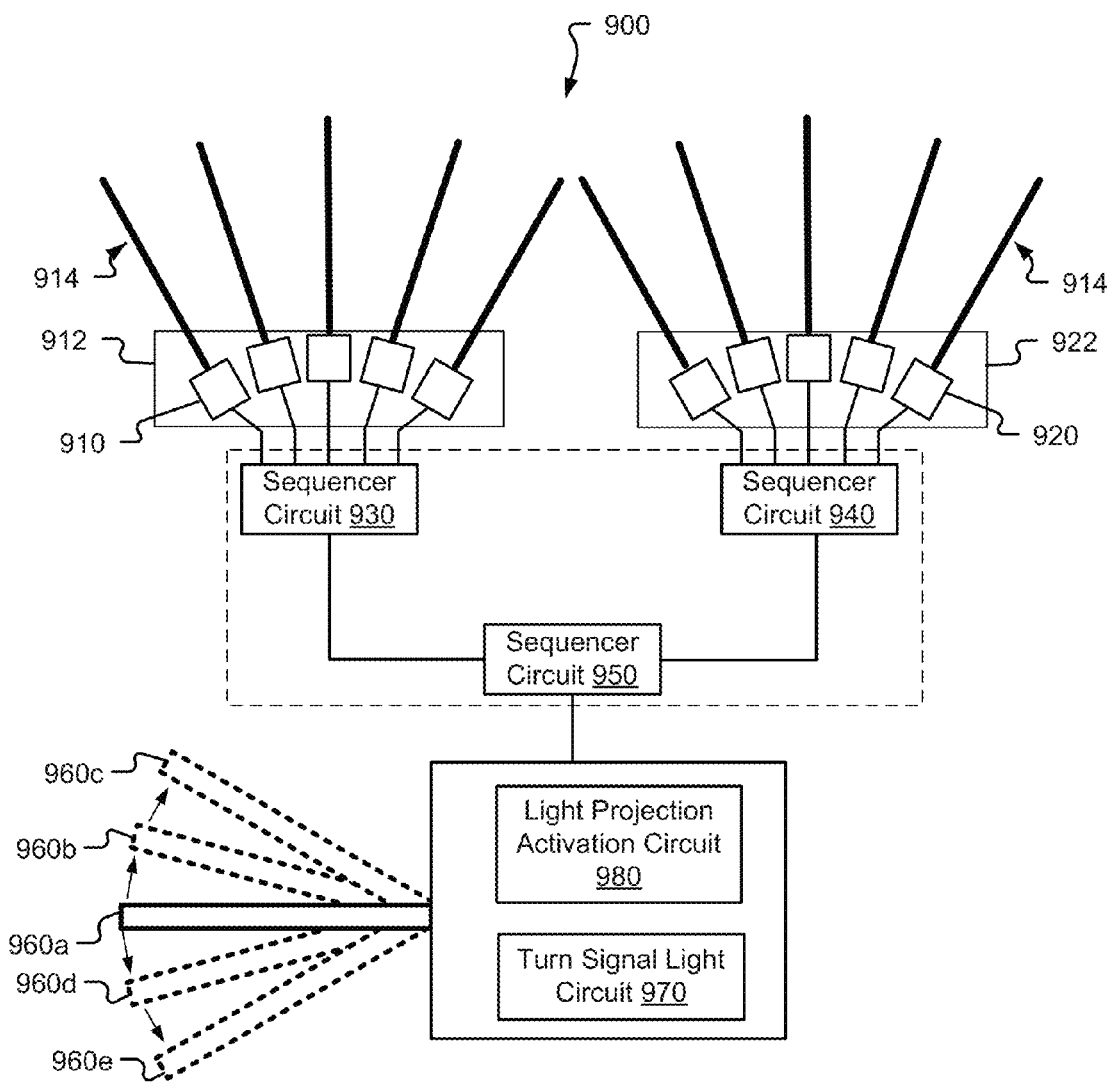
FIG. 9 is a block diagram of a vehicle turn signaling apparatus that may be configured to project a plurality of low divergence visible lines onto an adjacent driving lane, such as the projected line patterns of one or more of FIGS. 1-8, in accordance with some embodiments of the present invention.

FIG. 9 is a block diagram of an exemplary vehicle turn signaling apparatus 900 that may be configured to project a plurality of low divergence visible lines onto an adjacent driving lane in accordance with the embodiments of one or more of FIGS. 1-8. Referring to FIG. 9, the vehicle turn signaling apparatus 900 includes a first plurality of light sources 910 and a second plurality of light sources 920 their mounted on another support structure 922. Each of the light sources 910 and 920 may include a coherent light laser device that is configured to project a low divergence visible line (e.g., line 914) onto an adjacent driving lane. In some other embodiments, some or all of the light sources 910 920 may each include a light emitting diode device is configured to project a low divergence visible line onto an adjacent driving lane.

To form the exemplary line patterns 320a-b in FIG. 3 on an adjacent lane, the first plurality of light sources 910 may be spaced apart and connected at different light beam output angles to a first support structure 912. Similarly, the second plurality of light sources 920 may be spaced apart and connected at different light beam output angles to a second support structure 922. The relative angle and spacing between the light sources 910 on the first support structure 912 and between the light sources 920 on the second support structure 922 are selected to provide desired corresponding angle and length of the individual low divergence lines projected by each of the light sources 910 and 920 on the adjacent roadway lane.

Alternatively or additionally, the light sources 910 and 920 may be spaced further apart along the same or opposite sides of the vehicle to project lines that form all or a portion of the line pattern 520 of FIG. 6 and/or pattern 720 of FIG. 8. The light sources 910 and 920 may be spaced apart in a vertical direction on their respective support structures 912 and 922 with varying light beam output angles therebetween to project lines that form all or a portion of the exemplary line pattern 420*a-b* of FIG. 4, pattern 540 of FIG. 6, and/or pattern 740 of FIG. 8.

A sequencer circuit 930 may be included that is configured to sequentially power on and then off individual ones of the light sources 910 to project a sequence of lines that form all or a portion of the pattern 320*a-b* of FIG. 3, pattern 420*a-b* of FIG. 4, pattern 520 of FIG. 6, pattern 540 of FIG. 6, pattern 720 of FIG. 8, and/or pattern 740 of FIG. 8. Similarly, another sequencer circuit 940 may be included that is configured to sequentially power on and then off individual ones of the light sources 920 to project a sequence of lines that form all or a portion of the pattern 320*a-b* of FIG. 3, pattern 420*a-b* of FIG. 4, pattern 520 of FIG. 6, pattern 540 of FIG. 6, pattern 720 of FIG. 8, and/or pattern 740 of FIG. 8. Another sequencer circuit 950 may control the sequencer circuits 930 and 940 to synchronize the sequential pattern generated by the light sources 910 to the sequential pattern generated by the light sources 920.

In some embodiments, the light sources 910 and 920 may be synchronously controlled to project low divergence visible lines that appear to angularly sweep in opposite horizontal directions relative to each other along the respective portions of the adjacent driving lane (e.g., individual ones of the light sources 910 are sequentially activated to angularly sweep in a forward direction while individual ones of the light sources 920 are sequentially activated to angularly sweep in a reverse direction or vice versa). Alternatively, the light sources 910 and 920 may be synchronously controlled to project low divergence visible lines that appear to angularly sweep in the same horizontal direction along the respective portions of the adjacent driving lane (e.g., individual ones of the light sources 910 and light sources 920 are sequentially activated to angularly sweep in a forward direction and/or to angularly sweep in a reverse direction).

Alternatively or additionally, the sequencer circuits may be configured to flash on and off all of the light sources 910 and 920. The rate of flashing may be higher than the rate of flashing of other turn signal lighting mounted on the vehicle to be further distinctive and grab the attention of other drivers and/or to provide improved and desirable aesthetics. Moreover, the rate of flashing may be configured to change over time so as to be substantially aperiodic, which may be further attention grabbing in contrast to the relatively slow periodic flashing that drivers are accustomed to seeing on conventional turn signal lighting. In some embodiments, the flashing frequency of the light sources may be controlled to change over time to further increase the attention grabbing and/or desirable aesthetics of the projected pattern. For example, the light sources may be flashed periodically at a first frequency for a first duration, then flashed periodically at a second frequency for a second duration, and so on according to one or more defined frequency and duration timelines.

In some other embodiments, the light sources 910 and 920 may be synchronously controlled to project low divergence visible lines that appear to repetitively sweep away and/or toward the vehicle in opposite directions (e.g., individual ones of the light sources 910 are sequentially activated to sweep away from the vehicle while individual ones of the light sources 920 are activated to sweep toward the vehicle, and/or vice versa). Alternatively, the light sources 910 and 920 may be synchronously controlled to project low divergence visible lines that appear to angularly sweep away and/or toward the vehicle in the same direction at the same time (e.g., individual ones of the light sources 910 and light sources 920 are sequentially activated to angularly sweep away from the vehicle and/or to angularly sweep toward the vehicle).

Although three sequencer circuits 930, 940, and 950 have been illustrated in FIG. 9 for ease of explanation, the circuit is not limited thereto because one or more of the sequencer circuits may be combined into a single circuit (e.g., a single circuit board/circuit package) or their functionality may be distributed in any number of discrete circuits.

The sequencer circuits 930, 940, and/or 950 may be activated by a driver moving a turn signal stick 960, which may be similar to a conventional turn signal stick that is typically located on a left side of a steering wheel column of an automobile and/or a switch mechanism that is located on a left handlebar of a motorcycle. The turn signal stick 960 may be moved upward from a non-active position 960*a* to a first upward position 960*b* to activate a turn signal light circuit 970 that flashes a first set of conventional turn signal lights on a first side of vehicle. In some embodiments, the turn signal stick 960 may be moved further upward to a second upward position 960*c* to activate a light projection circuit 980 that causes one or more light sources on the first side of the vehicle to project low divergence visible line(s) on the adjacent driving lane to visibly warn other drivers that the driver of the vehicle may be intending to change lanes in that direction, and which may be carried out while continuing to flash the first set of conventional turn signal lights which were activated in the first upward position 960*b*. For example, the light projection circuit 980 may trigger the light sequencer circuits 930 and 950 to cause the light sources 910, connected to the first side of the vehicle, to project low divergence lines therefrom onto the adjacent driving lane. The light projection circuit 980, the turn signal light circuit 970, and the sequencer circuits 930, 940, and 950 may be collectively referred to as a turn signal circuit in accordance with some embodiments.

Similarly, the turn signal stick 960 may be moved downward from the non-active position 960*a* to a first downward position 960*d* to activate the turn signal light circuit 970 to flash a second set of conventional turn signal lights on a second side of vehicle. In some embodiments, the turn signal stick 960 may be moved further downward to a second downward position 960*e* to trigger the light projection circuit 980 to cause one or more light sources on the second side of the vehicle to project low divergence visible line(s) on the adjacent driving lane to visibly warn other drivers that the driver of the vehicle may be intending to change lanes in that direction, and which may be carried out while continuing to flash the first set of conventional turn signal lights which were activated in the first downward position 960*d*. For example, the light projection circuit 980 may trigger the light sequencer circuits 940 and 950 to cause the light sources 920, connected to the second side of the vehicle, to project low divergence lines therefrom onto the adjacent driving lane.

Figure 10:
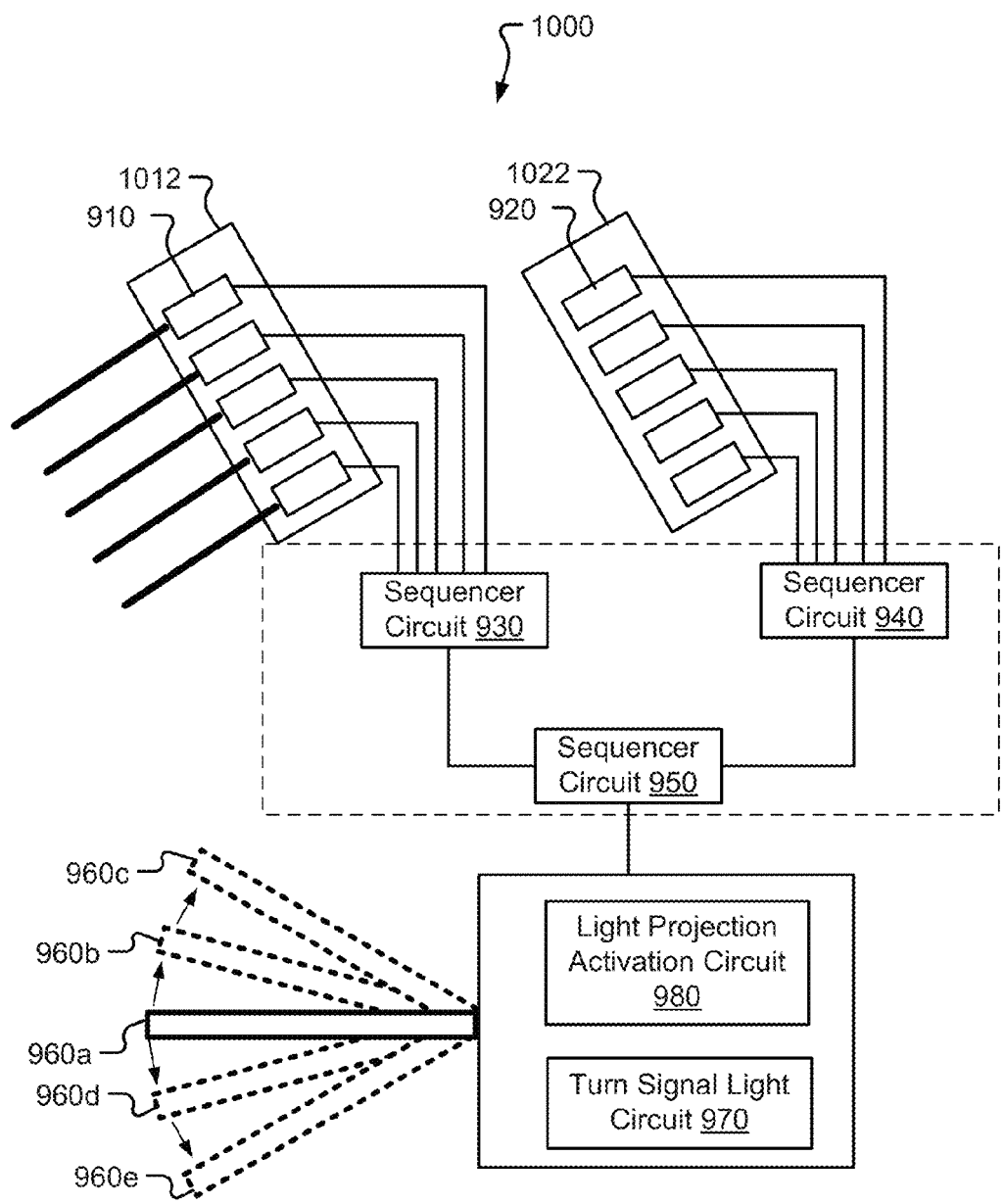
FIG. 10 is a block diagram of another vehicle turn signaling apparatus that may be configured to project a plurality of low divergence visible lines onto an adjacent driving lane, such as the projected line patterns of one or more of FIGS. 1-8, in accordance with some embodiments of the present invention.

FIG. 10 is a block diagram of another exemplary vehicle turn signaling apparatus 1000 that may be configured to project a plurality of low divergence visible lines onto an adjacent driving lane in accordance with the embodiments of one or more of FIGS. 1-8 and/or other embodiments. The apparatus 1000 of FIG. 10 differs from the apparatus 900 of FIG. 9 in the configuration of the light sources 910 and 920. In FIG. 10, the light sources 910 are spaced apart in a vertical direction on a support structure 1012 and the light sources 920 are spaced apart in a vertical direction on another support structure 1022. Spacing the individual light sources 910 and 920 in the vertical direction may simplify creation of the line patterns that are spaced apart across an adjacent lane, such as the exemplary patterns of 420*a-b* of FIG. 4, pattern 540 of FIG. 6, and pattern 740 of FIG. 8. The elements of FIG. 10 having the same numbering as elements in FIG. 9 may operate in the same/similar manner as described above.

Figure 11:
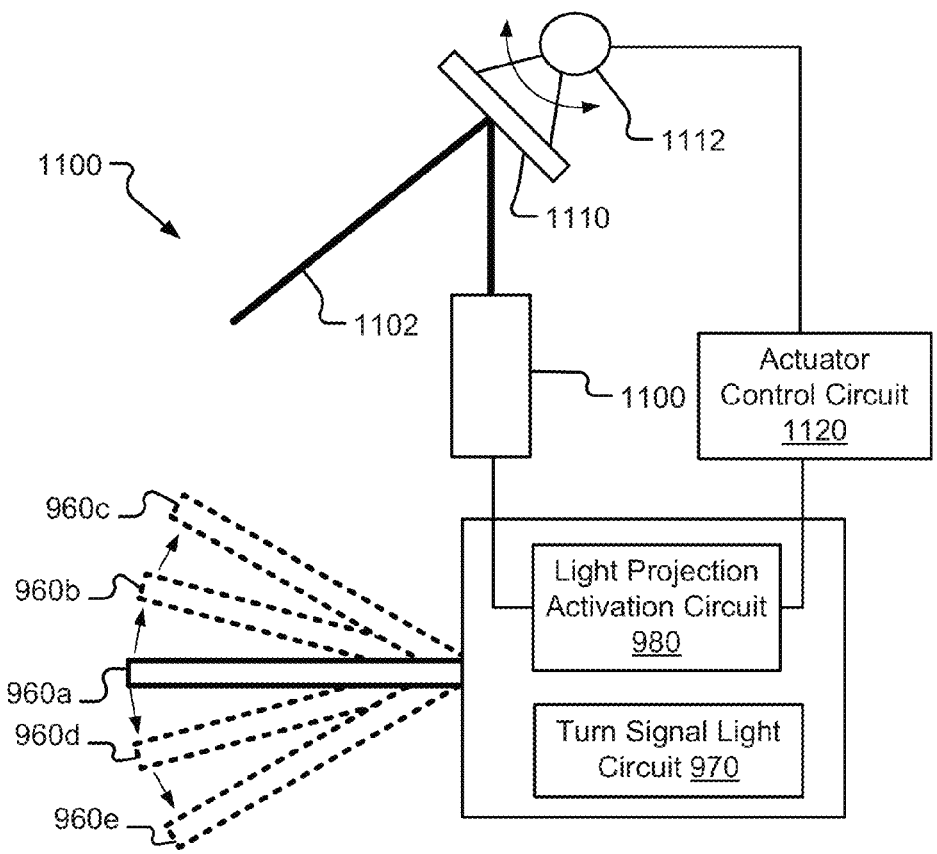
FIG. 11 is a block diagram of another vehicle turn signaling apparatus that may be configured to project a continuously scanned low divergence visible line or a plurality of discrete low divergence visible lines onto an adjacent driving lane, such as the projected line patterns of one or more of FIGS. 1-8, in accordance with some embodiments of the present invention.

FIG. 11 is a block diagram of another exemplary vehicle turn signaling apparatus 1100 that may be configured to project a plurality of low divergence visible lines onto an adjacent driving lane in accordance with the embodiments of one or more of FIGS. 1-8 and/or other embodiments. The apparatus 1100 of FIG. 11 includes a light source 1100 that is configured to project a low divergence beam onto a mirror 1110 that is angularly rotated (e.g., back and forth or spinning complete revolutions) by an actuator (e.g., motor) 1112. An actuator control circuit 1120 controls movement of the actuator 1112 to move the mirror 1110 in a manner that reflects the low divergence beam from the light source 1100 onto an adjacent roadway lane to scan one or more lines that form one or more of the lines/patterns described above with regard to FIGS. 1-8 and/or other patterns.

The mirror 1110 may be rotated horizontally, vertically, and/or a combination thereof to reflect the light beam from the light source 1100 at different angles to generate the line patterns of FIGS. 1-8 and/or other patterns. The light projection activation circuit 980 may regulate power to the light source 1100 responsive to movement of the turn signal stick 960*a* as described above to project a continuously scanned low divergence visible line on the adjacent lane. The activation circuit 980 may cycle the power on and off (e.g., regulate a power duty cycle) to the light source 1100 to cause a plurality of discrete spaced apart lines to be scanned onto the adjacent lane. For example, the mirror 1110 may be rotated back and forth horizontally while cycling power to light source 1100 on and off to generate the line patterns 320*a-b* of FIG. 3. In contrast, the mirror 1110 may be rotated back and forth vertically while cycling power to light source 1100 on and off to generate the line patterns 420*a-b* of FIG. 4. Accordingly, various line patterns may thereby be generated using less light sources that what may be needed when the light sources are configured to each project a stationary light beam onto the adjacent lane.

Figure 12:
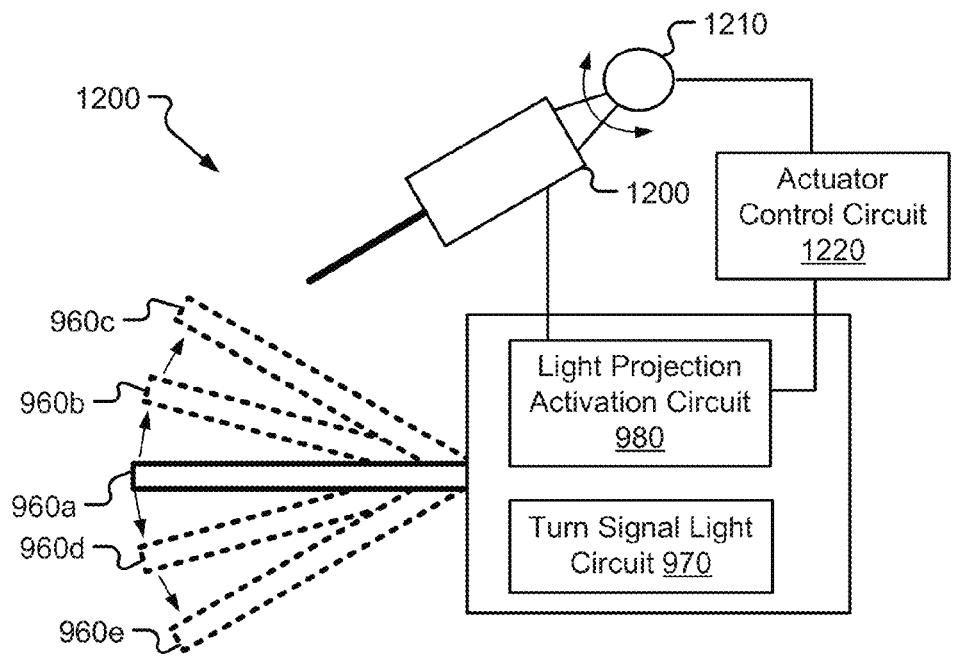
FIG. 12 is a block diagram of another vehicle turn signaling apparatus that may be configured to project a continuously scanned low divergence visible line or a plurality of discrete low divergence visible lines onto an adjacent driving lane, such as the projected line patterns of one or more of FIGS. 1-8, in accordance with some embodiments of the present invention.

FIG. 12 is a block diagram of another exemplary vehicle turn signaling apparatus 1200 that may be configured to project a plurality of low divergence visible lines onto an adjacent driving lane in accordance with the embodiments of one or more of FIGS. 1-8 and/or other embodiments. The apparatus 1200 of FIG. 12 includes a light source 1200 that is configured to project a low divergence beam onto an adjacent roadway lane. In contrast to the apparatus 1100 of FIG. 11, the light source 1200 is connected to be angularly rotated by an actuator (e.g., motor) 1210. An actuator control circuit 1220 controls movement of the actuator 1210 to move the light source 1200 so as to scan the low divergence beam and form one or more of the lines/patterns described above with regard to FIGS. 1-8 and/or other patterns.

The light source 1200 may be rotated horizontally, vertically, and/or a combination thereof to project the light beam from the light source 1100 at different angles to generate the line patterns of FIGS. 1-8 and/or other patterns. The light projection activation circuit 980 may regulate power to the light source 1200 responsive to movement of the turn signal stick 960*a* as described above to project a continuously scanned low divergence visible line on the adjacent lane. The activation circuit 980 may cycle the power on and off (e.g., regulate a power duty cycle) to the light source 1200 to cause a plurality of spaced apart discrete lines to be scanned onto the adjacent lane. For example, the light source 1200 may be rotated back and forth horizontally while cycling its power on and off to generate the line patterns 320*a-b* of FIG. 3. In contrast, the light source 1200 may be rotated back and forth vertically while its power is cycled on and off to generate the line patterns 420*a-b* of FIG. 4. Accordingly, various line patterns may be generated using less light sources that what may be needed when the light sources are configured to each project a stationary light beam onto the adjacent lane.

As explained above, the lines in FIGS. 1-8 have been illustrated as being solid (continuous), however other embodiment of the invention are not limited thereto. For example, one or more of the illustrated lines that are projected on an adjacent lane may be segmented (dashed) by passing the respective light beam through a filter having segmented openings across the illuminated area, by angularly scanning the light beam while cycling the power on and off to the light source, and/or by forming the projected line from a plurality of light sources that project non-overlapping line segments on the adjacent lane.

Accordingly, as has been described in the above specification and illustrated in FIGS. 1-13, in one embodiment a vehicle turn signaling apparatus includes a plurality of light sources, each of the light sources is powered by a turn signal circuit of the vehicle and is configured to project a low divergence visible line onto a driving lane adjacent to the vehicle in response to activation of the turn signal circuit, the low divergence visible line increasing in width less than one inch as it extends as a continuous line for at least one foot on the driving lane adjacent to the vehicle to visibly warn other drivers where a driver of the vehicle can intend to move the vehicle. One of the light sources is mounted to a front portion of the vehicle and configured to project a low divergence visible line increasing in width less than one inch as it extends as a continuous line for at least one foot on the driving lane adjacent to the front of the vehicle in response to activation of the turn signal circuit. Another one of the light sources is mounted to a rear portion of the vehicle and configured to project a low divergence visible line increasing in width less than one inch as it extends as a continuous line for at least one foot on the driving lane adjacent to the rear of the vehicle in response to activation of the turn signal circuit, wherein the low divergence visible lines on the driving lane adjacent to the front and rear of the vehicle form a visible line pattern that warns other drivers where the driver of vehicle can intend to move the vehicle.

In a further embodiment, each of the light sources includes a coherent light laser device that is configured to project a low divergence visible line that increases in width less than about one inch as it extends as a continuous line for at least four feet on the adjacent driving lane.

In a further embodiment, each of the light sources includes a light emitting diode device that is configured to project a low divergence visible line that increases in width less than about one inch as it extends as a continuous line for at least four feet on the adjacent driving lane.

The vehicle turn signaling apparatus can further include a sequencer circuit that is configured to sequentially supply power to the light source to flash the continuous line on the driving lane adjacent to the vehicle at a periodic rate that is higher than a periodic rate of flashing of turn signal lighting on a body of the vehicle to increase the attention grabbing provided thereby to other drivers relative to the slower periodic flashing of the turn signal lighting that the other drivers are overly accustomed to seeing.

The vehicle turn signaling apparatus can further include a sequencer circuit that is configured to sequentially supply power to the light source to flash the continuous line on the driving lane adjacent to the vehicle at an aperiodic rate that changes over time to increase the attention grabbing provided thereby to other drivers relative to the periodic turn signal lighting that the other drivers are overly accustomed to seeing.

Another embodiment of a vehicle turn signaling apparatus includes a plurality of light sources, each of the light sources is powered by a turn signal circuit of the vehicle and is configured to project a low divergence visible line onto a driving lane adjacent to the vehicle in response to activation of the turn signal circuit, the low divergence visible line increasing in width less than one inch as it extends as a continuous line for at least one foot on the driving lane adjacent to the vehicle to visibly warn other drivers where a driver of the vehicle can intend to move the vehicle. A first plurality of the light sources are spaced apart and connected at different light beam output angles to a first support structure on the vehicle, and wherein the first plurality of the light sources are configured to project the low divergence visible lines on the adjacent driving lane extending in directions away from the vehicle and spaced apart in a direction of travel of the vehicle.

In a further embodiment, the vehicle turn signaling apparatus further includes a sequencer circuit that is configured to sequentially supply power to individual ones of the first plurality of light sources to project a first line pattern that appears to angularly sweep horizontally along a portion of the adjacent driving lane.

In a further embodiment, the vehicle turn signaling apparatus further includes a second plurality of the light sources that are spaced apart and connected at different light beam output angles to a second support structure on the vehicle. The second plurality of the light sources are configured to project the low divergence visible lines on the adjacent driving lane and extending in directions away from the vehicle and spaced apart in the direction of travel of the vehicle. The sequencer circuit is further configured to sequentially supply power to individual ones of the second plurality of light sources to project a second line pattern that appears to angularly sweep horizontally along a portion of the adjacent driving lane. The first and second support structures are connected to spaced apart locations on the vehicle so that the first plurality of the light sources project the first line pattern along a portion of the driving lane adjacent to a rear portion of the vehicle and so that the second plurality of the light sources project the second line pattern along a portion of the driving lane adjacent to a front portion of the vehicle.

In a further embodiment, the sequencer circuit is further configured to sequentially supply power to individual ones of the first and second plurality of light sources to project the first and second line patterns therefrom that appear to angularly sweep in opposite relative directions along the respective portions of the adjacent driving lane.

In a further embodiment, each of the light sources are configured to project low divergence visible lines that each extend as a continuous line for at least four feet on the adjacent driving lane at different horizontal angles relative to each other. The sequencer circuit is further configured to sequentially supply power to individual ones of the first and second plurality of light sources to project the first and second line patterns therefrom that appear to angularly sweep in a same, relative direction along the respective portions of the adjacent driving lane.

In a further embodiment, the sequencer circuit is configured to sequentially supply power to individual ones of the first plurality of light sources at a periodic rate that is higher than a periodic rate of flashing of turn signal lighting on a body of the vehicle to increase the attention grabbing provided thereby to other drivers relative to the slower periodic flashing of the turn signal lighting that the other drivers are overly accustomed to seeing.

Another embodiment of a vehicle turn signaling apparatus includes a plurality of light sources. Each of the light sources is powered by a turn signal circuit of the vehicle and is configured to project a low divergence visible line onto a driving lane adjacent to the vehicle in response to activation of the turn signal circuit, the low divergence visible line increasing in width less than one inch as it extends as a continuous line for at least one foot on the driving lane adjacent to the vehicle to visibly warn other drivers where a driver of the vehicle can intend to move the vehicle. A first plurality of the light sources are spaced apart and connected at different light beam output angles to a first support structure. The first plurality of light sources are configured to project the low divergence visible lines on the driving lane adjacent to the vehicle and extending in the direction of travel of the vehicle and spaced apart in a direction away from the vehicle.

The vehicle turn signaling apparatus can further include a sequencer circuit that is configured to sequentially supply power to individual ones of the first plurality of light sources to project a first moving line pattern that appears to sweep across a portion of the adjacent driving lane away from and/or toward the vehicle.

The vehicle turn signaling apparatus can further include a second plurality of the light sources are spaced apart and connected at different light beam output angles to a second support structure. The second plurality of the light sources are each configured to project the low divergence visible line on the driving lane adjacent to the vehicle and extending in the direction of travel of the vehicle and spaced apart in a direction away from the vehicle. The sequencer circuit is further configured to sequentially supply power to individual ones of the second plurality of light sources to project a second moving line pattern that appears to sweep across another portion of the adjacent driving lane away from and/or toward the vehicle. The first and second support structures are attached to spaced apart locations on the vehicle so that the first moving line pattern is projected onto a portion of the adjacent driving lane that is adjacent to a rear portion of the vehicle and so that the second plurality of the light sources project the second moving line pattern onto a portion of the adjacent driving lane that is adjacent to a front portion of the vehicle.

Another embodiment of a vehicle turn signaling apparatus includes a plurality of light sources. Each of the light sources is powered by a turn signal circuit of the vehicle and is configured to project a low divergence visible line onto a driving lane adjacent to the vehicle in response to activation of the turn signal circuit, the low divergence visible line increasing in width less than one inch as it extends as a continuous line for at least one foot on the driving lane adjacent to the vehicle to visibly warn other drivers where a driver of the vehicle can intend to move the vehicle. The light sources are at least partially disposed within the vehicle body below door openings that provide access to a passenger compartment.

The vehicle turn signaling apparatus can further include a sequencer circuit that is configured to sequentially supply power to individual ones of the first plurality of light sources to project lines that appear to sweep along and/or across a portion of the driving lane adjacent to the respective light sources.

Another embodiment of a vehicle turn signaling apparatus includes a plurality of light sources. Each of the light sources is powered by a turn signal circuit of the vehicle and is configured to project a low divergence visible line onto a driving lane adjacent to the vehicle in response to activation of the turn signal circuit, the low divergence visible line increasing in width less than one inch as it extends as a continuous line for at least one foot on the driving lane adjacent to the vehicle to visibly warn other drivers where a driver of the vehicle can intend to move the vehicle. The light sources are at least partially disposed within running boards connected to the vehicle below door openings.

Another embodiment of a vehicle turn signaling apparatus includes a plurality of light sources. Each of the light sources is powered by a turn signal circuit of the vehicle and is configured to project a low divergence visible line onto a driving lane adjacent to the vehicle in response to activation of the turn signal circuit, the low divergence visible line increasing in width less than one inch as it extends as a continuous line for at least one foot on the driving lane adjacent to the vehicle to visibly warn other drivers where a driver of the vehicle can intend to move the vehicle. The light sources are at least partially disposed within a roof rack on the vehicle and are angled downward to project the low divergence visible lines onto the adjacent driving lane.

Another embodiment of a vehicle turn signaling apparatus includes a light source that is powered by a turn signal circuit of the vehicle and is configured to project a low divergence visible line onto a driving lane adjacent to the vehicle in response to activation of the turn signal circuit, the low divergence visible line increasing in width less than 1 inch as it extends as a continuous line for at least one foot on the driving lane adjacent to the vehicle to visibly warn other drivers where a driver of the vehicle can intend to move the vehicle. A turn signal stick extends from a steering wheel column of the vehicle. Movement of the turn signal stick from an idle position to a first position activates turn signal lights to flash light from a corresponding side of the vehicle, and movement of the turn signal stick from the first position to a second position activates the light source to project the low divergence visible line onto the driving lane that is adjacent to the corresponding side of the vehicle.

Another embodiment of a vehicle turn signaling apparatus includes a light source that is powered by a turn signal circuit of the vehicle and is configured to project a low divergence visible line onto a driving lane adjacent to the vehicle in response to activation of the turn signal circuit, the low divergence visible line increasing in width less than 1 inch as it extends as a continuous line for at least one foot on the driving lane adjacent to the vehicle to visibly warn other drivers where a driver of the vehicle can intend to move the vehicle. A mirror is connected to a rotary actuator. The light source is configured to project a light beam toward the mirror, and the mirror is angularly rotated by the actuator to scan the light beam from the light source along a path on the adjacent lane to form the continuous line extending along the path on the adjacent lane.

Another embodiment of a vehicle turn signaling apparatus includes a light source that is powered by a turn signal circuit of the vehicle and is configured to project a low divergence visible line onto a driving lane adjacent to the vehicle in response to activation of the turn signal circuit, the low divergence visible line increasing in width less than 1 inch as it extends as a continuous line for at least one foot on the driving lane adjacent to the vehicle to visibly warn other drivers where a driver of the vehicle can intend to move the vehicle. A rotary actuator is connected to the rotary actuator to scan the light beam from the light source along a path on the adjacent lane to form the continuous line extending along the path on the adjacent lane.

Another embodiment of a vehicle turn signaling apparatus includes a plurality of light sources. Each of the light sources is powered by a turn signal circuit of the vehicle and is configured to project a low divergence visible line onto a driving lane adjacent to the vehicle in response to activation of the turn signal circuit, the low divergence visible line increasing in width less than one inch as it extends as a continuous line for at least one foot on the driving lane adjacent to the vehicle. The plurality of the light sources are configured to project the low divergence visible lines substantially connected end-to-end to one another to form a bracket shaped symbol on the driving lane adjacent to the vehicle to visibly warn other drivers where the driver of the vehicle can intend to move the vehicle.

Another embodiment of a vehicle turn signaling apparatus includes a plurality of light sources. Each of the light sources is powered by a turn signal circuit of the vehicle and is configured to project a low divergence visible line onto a driving lane adjacent to the vehicle in response to activation of the turn signal circuit, the low divergence visible line increasing in width less than one inch as it extends as a continuous line for at least one foot on the driving lane adjacent to the vehicle. The plurality of the light sources that are configured to project the low divergence visible lines substantially connected end-to-end to one another to form an arrow shaped symbol on the driving lane adjacent to the vehicle to visibly warn other drivers where the driver of the vehicle can intend to move the vehicle.

Some embodiments of the vehicle turn signaling apparatuses disclosed herein include one or more laser light devices. A laser light beam above certain combinations of power densities and frequencies can potentially damage a human eye if exposed for sufficient time. However, vehicle manufacturers may desire to use high power density and/or high frequency laser light beams with some embodiments disclosed herein because of the aesthetically pleasing viewability of the lines/spots projected on an adjacent driving lane and/or viewability of the laser light beam along the air interface between the laser light device and the driving lane. Some further embodiments disclosed herein can allow use of high power density and/or high frequency laser light beams while preventing potential damage to eyes of pedestrians or others who attempt to be or happen to be in the pathway of the beam.

In one embodiment, a vehicle turn signaling apparatus includes a laser light device and a turn signal laser light projection activation circuit. The laser light device is configured to project a laser light beam of visible wavelength toward a road surface adjacent to the vehicle to visibly warn other drivers where a driver of the vehicle can intend to move the vehicle. The turn signal laser light projection activation circuit receives a turn signal which indicates that the driver intends to move the vehicle to the road surface adjacent to the vehicle. The turn signal laser light projection activation circuit is configured to respond to the turn signal while the vehicle is moving faster than a first threshold speed by controlling the laser light device to project the laser light beam toward the road surface adjacent to the vehicle, and respond to the turn signal while the vehicle is moving slower than a second threshold speed by controlling the laser light device to prevent the laser light beam from being projected toward the road surface adjacent to the vehicle.

Figure 13:
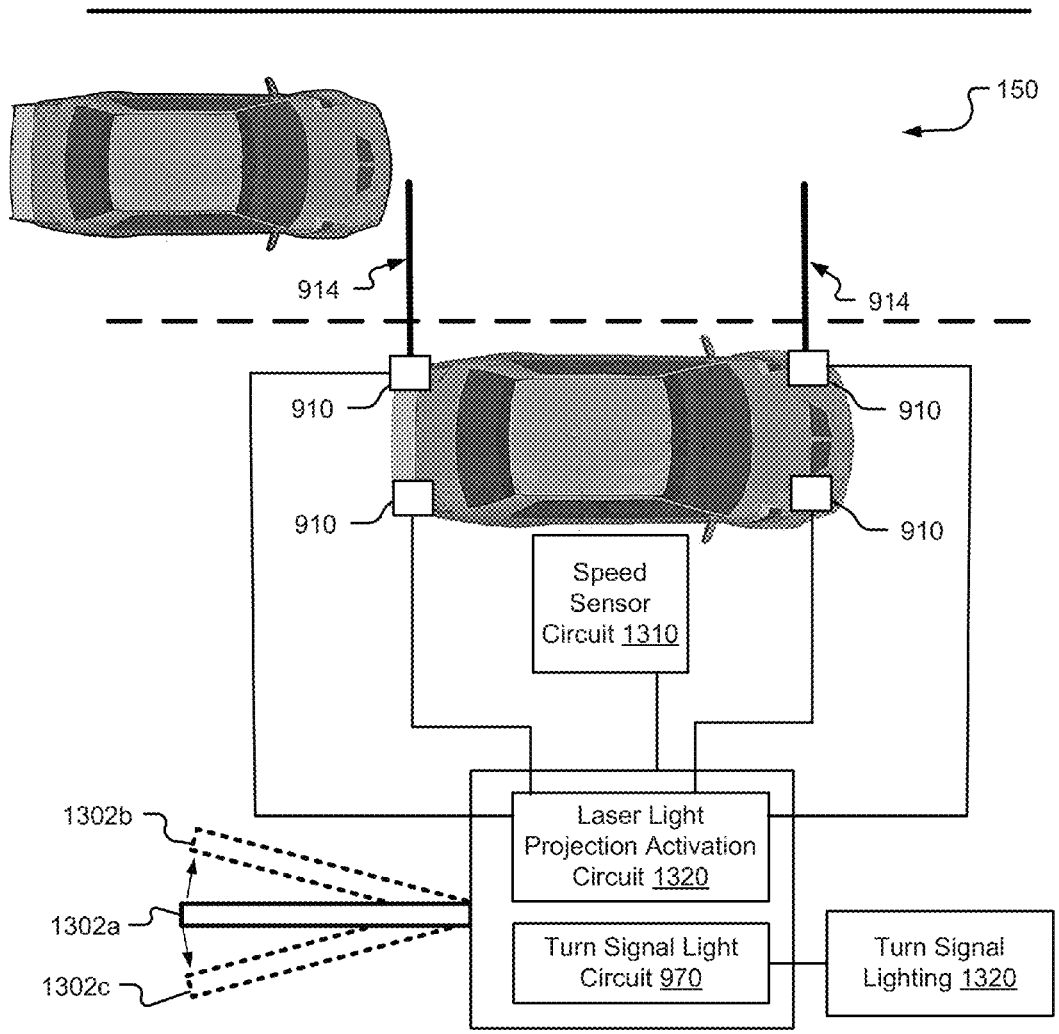
FIG. 13 is a block diagram of another vehicle turn signaling apparatus that may be configured to control the projection of a laser light beam of visible wavelength toward a road surface responsive to vehicle speed, in accordance with some embodiments of the present invention.

These and further embodiments of a vehicle turn signaling apparatus are illustrated by the non-limiting vehicle turn signaling apparatus of FIG. 13. Referring to FIG. 13, the vehicle includes a speed sensor circuit 1310 that outputs a speed signal that indicates the vehicle speed. A turn signal is generated responsive to a driver moving a turn signal stick 1302 from a neutral position 1302a to position 1302b to indicate an intention to turn the car in a first direction, and responsive to a driver moving a turn signal stick 1302 from the neutral position 1302a to position 1302c to indicate an intention to turn the car in an opposite second direction.

A turn signal laser light projection activation circuit 1320 can be configured to respond to the speed signal while the vehicle is moving faster than the first threshold speed by powering-on the laser light device to project the laser light beam toward the road surface adjacent to the vehicle, and respond to the turn signal while the vehicle is moving slower than the second threshold speed by preventing the laser light device from being powered-on to prevent the laser light beam from being projected toward the road surface adjacent to the vehicle.

Thus, referring to FIG. 13, moving the turn signal stick 1302 to position 1302b while the vehicle is moving faster than the first threshold speed can cause the turn signal laser light projection activation circuit 1320 to power-on the laser light devices 910 near the front and rear of the front passenger's side of the vehicle to project the laser light beam toward the road surface to that side of the vehicle. Similarly, moving the turn signal stick 1302 to position 1302c while the vehicle is moving faster than the first threshold speed can cause the turn signal laser light projection activation circuit 1320 to power-on the laser light devices 910 near the front and rear of the driver's side of the vehicle to project the laser light beam (e.g., laser light beams 914) toward the road surface adjacent to that side of the vehicle.

The laser light devices 910 may each be configured to project a low divergence visible line increasing in width less than one inch as it extends as a continuous line for at least one foot on the driving lane adjacent to the vehicle. Alternatively, the laser light devices 910 may each be configured to project a spot on the driving lane adjacent to the vehicle.

In contrast, moving the turn signal stick 1302 to position 1302b while the vehicle is moving slower than the second threshold speed can cause the turn signal laser light projection activation circuit 1320 to prevent the laser light devices 910 near the front and rear of the front passenger's side of the vehicle from being powered-on to prevent the laser light beam from being projected toward the road surface to that side of the vehicle. Similarly, moving the turn signal stick 1302 to position 1302c while the vehicle is moving slower than the second threshold speed can cause the turn signal laser light projection activation circuit 1320 to prevent the laser light devices 910 near the front and rear of the driver's side of the vehicle from being powered-on to prevent the laser light beam from being projected toward the road surface to that side of the vehicle.

The first threshold speed can be set equal to the second threshold speed (e.g., using a single threshold value for comparison), although setting the first threshold speed to be different than the second threshold speed can avoid jittering between turning on/off the laser light device as the vehicle speed fluctuates near the threshold speed(s).

The threshold speed(s) can be defined so that the laser light beams are only projected while the vehicle is moving, which avoids a person unintentionally staring into one of the laser light devices 910 or its projected laser beam for an excessive time duration that could result in potential eye damage. It may be preferable for at least one of the first and second threshold speeds to be at least 2 miles per hour, which corresponds to a fast average walking speed for humans, to further prevent a person from intentionally/unintentionally staring into one of the laser light devices 910 or its projected laser beam for an excessive time duration that could result in potential eye damage. It may be even more preferable for at least one of the first and second threshold speeds to be at least 5 miles per hour, which corresponds to an average running speed for humans, to further prevent a person from intentionally/unintentionally staring into one of the laser light devices 910 or its projected laser beam for an excessive time duration that could result in potential eye damage. Faster threshold speeds may be desirable to further avoid a person moving along a side of the vehicle to stare into one of the laser light devices 910 or its projected laser beam for an excessive time duration that could result in potential eye damage.

A turn signal light circuit 970 can operate in a conventional manner to respond to the turn signal to repetitively flash conventional turn signal lighting 1320 mounted to corner regions of the vehicle (e.g., front and rear turn lighting) without being responsive to the vehicle speed. Accordingly, in sharp contrast to one embodiment of the turn signal laser light projection activation circuit 1320, the turn signal light circuit 970 can flash turn signal lighting without regard to the vehicle speed.

Some other vehicle turn signaling apparatuses work in conjunction with an object sensor circuit that outputs an object warning signal indicating that an object is detected in the path of a laser light beam from a laser light device to the road surface adjacent to the vehicle. These vehicle turn signaling apparatuses use the object warning signal to determine whether an object, which may potentially be a person, is in the path of a laser light beam from a laser light device to the road surface adjacent to the vehicle and, if so, to prevent the laser light beam from being projected to the road surface. Thus, for example, if a child is attempting to stare into the laser light devices while the turn signal stick is turned to signal on that side of the vehicle, the laser light device can sense the presence of the child and the vehicle turn signaling apparatuses can respond to the object warning signal by turning off or maintaining off the corresponding laser light device.

Figure 14:
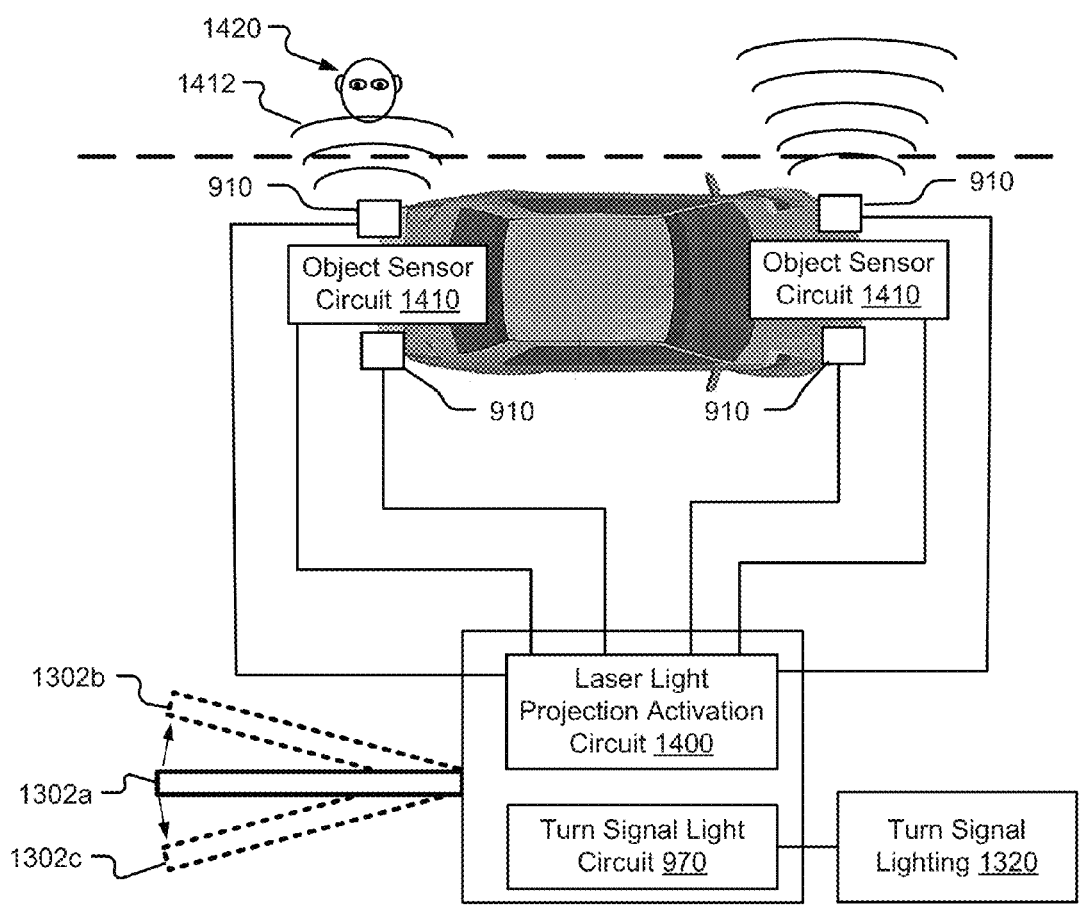
FIG. 14 is a block diagram of another vehicle turn signaling apparatus that may be configured to control the projection of a laser light beam of visible wavelength toward a road surface responsive to whether an object is in a path of a laser light beam from a laser light device to the road surface adjacent to the vehicle, in accordance with some embodiments of the present invention.

In the example embodiment of FIG. 14, object sensor circuits 1410 are spaced apart on the vehicle and configured to sense whether an object (e.g., person 1420) is detected in the path of a laser light beam from a laser light device 910 to the road surface adjacent to the vehicle, and output the object warning signal indicating when an object is sensed. The object sensor circuits 1420 may be conventional blind spot monitor sensors that are presently available on vehicles, such as ultrasonic sensors and/or radar sensors that monitor reflected ultrasonic signals and/or radar signals 1412 from an object 1420. The object sensor circuits 1420 may alternatively or additionally include camera(s) with associated image processing logic configured to detect objects in video from the camera(s). The sensor circuits 1420 may therefore also be configured to be used to sense adjacent objects when parking the vehicle and/or while changing lanes while driving.

A turn signal laser light projection activation circuit 1400 receives a turn signal, which indicates that the driver intends to move the vehicle to the road surface adjacent to the vehicle, and the object warning signal, which indicates that an object is detected in a path of the laser light beam from the laser light device to the road surface adjacent to the vehicle in a direction of the indicated turning of the vehicle. The turn signal laser light projection activation circuit 1400 is configured to respond to the turn signal during absence of the object warning signal indicating an object is in the path of the laser light beam from the laser light device 910 to the road surface adjacent to the vehicle, by controlling the laser light device 910 to project the laser light beam toward the road surface adjacent to the vehicle. The turn signal laser light projection activation circuit 1400 is further configured to respond to the turn signal while the object warning signal indicates an object is in the path of the laser light beam from the laser light device 910 to the road surface adjacent to the vehicle by controlling the laser light device 910 to prevent the laser light beam from being projected toward the road surface adjacent to the vehicle.

Thus, referring to FIG. 14, moving the turn signal stick 1302 to position 1302b while the object 1420 is detected by the object sensor circuit 1410 can cause the turn signal laser light projection activation circuit 1320 to power-on the laser light devices 910 near the front and rear of the front passenger's side of the vehicle to project the laser light beam toward the road surface to that side of the vehicle. In contrast, moving the turn signal stick 1302 to position 1302c while the object 1420 is detected by the object sensor circuit 1410 can cause the turn signal laser light projection activation circuit 1320 to prevent the laser light devices 910 near the front and rear of the driver's side of the vehicle from being powered on to prevent a laser light beam from being projected toward the object 1420 (and potentially being viewed by a human).

The laser light devices 910 may each be configured to project a low divergence visible line increasing in width less than one inch as it extends as a continuous line for at least one foot on the driving lane adjacent to the vehicle. Alternatively, the laser light devices 910 may each be configured to project a spot on the driving lane adjacent to the vehicle.

A turn signal light circuit 970 can operate in a conventional manner to respond to the turn signal to repetitively flash conventional turn signal lighting 1320 mounted to corner regions of the vehicle (e.g., front and rear turn lighting) without being responsive to the object warning signal from the object sensor circuit(s) 1410.

Although FIGS. 13 and 14 illustrate four laser light devices 910 attached to the vehicle, any number of laser light devices may be used with these embodiments and may be attached to any location(s) on the vehicle where a laser light beam can be projected onto an adjacent road surface. Moreover, although FIG. 14 illustrates two object sensor circuits 1410 attached to the vehicle, any number of object sensor circuits 1410 may be used with these embodiments and may be attached to any location(s) on the vehicle that allows operations to detect an object in the path of the laser light beam from the laser light device(s) 910 to the road surface adjacent to the vehicle.

Structure and operation of the embodiments of FIGS. 13 and 14 may be combined. For example, the turn signal laser light projection activation circuit 1400 can be further configured to respond to the turn signal and during absence of the object warning signal indicating an object is in the path of the laser light beam from one or more of the laser light devices 910 to the road surface adjacent to the vehicle while the vehicle is moving faster than a first threshold speed (e.g., comparing the speed signal from speed sensor circuit 1310 to a threshold value) by controlling one or more of the laser light devices 910 to project the laser light beam toward the road surface adjacent to the vehicle. In contrast, the turn signal laser light projection activation circuit 1400 can be configured to respond to the turn signal and during absence of the object warning signal indicating an object is in the path of the laser light beam from one or more of the laser light devices 910 to the road surface adjacent to the vehicle while the vehicle is moving slower than a second threshold speed by controlling one or more of the laser light devices 910 to prevent the laser light beam from being projected toward the road surface adjacent to the vehicle. The turn signal laser light projection activation circuit 1400 can also be configured to respond to the turn signal while the object warning signal indicates an object is in the path of the laser light beam from one or more of the laser light devices 910 to the road surface adjacent to the vehicle and while the vehicle is moving faster than the first threshold speed by controlling the laser light device to prevent the laser light beam from being projected toward the road surface adjacent to the vehicle.

Thus, if the vehicle is moving faster than the first threshold speed, the turn signal laser light projection activation circuit 1400 can turn-on a laser light device 910 if no object has been detected in the path of the laser light beam. Such operation may be advantageous to avoid shining the laser light beam toward another vehicle that is adjacent to the vehicle in the path of the laser light beam or sufficiently close to possibly soon become within the pathway.

Some other vehicle turn signaling apparatuses work in conjunction with an ambient light sensor to control the laser light device(s) to adjust power density of the laser light beam responsive to brightness of ambient light at a location on the vehicle. For example, the laser light beam or spot/line that is formed therefrom on the road surface may be controlled to be brighter responsive to brighter ambient light conditions so that it is more easily seen by drivers in adjacent vehicles. Similarly, lower brightness ambient light conditions can cause a reduction in the brightness of the laser light beam or spot/line that is formed therefrom on the road surface. This operation may be particularly beneficial to lower the brightness at night when a daytime brightness level may undesirably be perceived as concerning to other drivers, and to increase the brightness during bright daytime when an appropriate night time level may not be adequately viewable by other drivers In the example embodiment of FIG. 15, one or more laser light devices 910 are configured to project a laser light beam of visible wavelength toward a road surface adjacent to the vehicle to visibly warn other drivers where a driver of the vehicle can intend to move the vehicle. An ambient light sensor 1510 is configured to output an ambient light brightness signal indicating brightness of ambient light at a location on the vehicle. A turn signal laser light projection activation circuit 1500 receives a turn signal (e.g., from a conventional turn signal circuit) which indicates that the driver intends to move the vehicle to the road surface adjacent to the vehicle, and is configured to respond to the turn signal by controlling the laser light device(s) 910 to project the laser light beam toward the road surface adjacent to the vehicle (e.g., project beam(s) toward driver's side of car to signal turning in that direction and project beam(s) toward front passenger's side of car to signal turning in that direction), and to control the laser light device(s) 910 to adjust power density of the laser light beam responsive to the ambient light brightness signal.

The turn signal laser light projection activation circuit 1500 can be configured to control the laser light device(s) 910 to adjust power density of the laser light beam responsive to the ambient light brightness signal, by preventing the laser light device(s) 910 from being powered-on while the ambient light brightness signal indicates that the brightness of the ambient light exceeds a threshold brightness level. In one embodiment, the laser light device(s) 910 can each include a plurality of laser light sources, and the turn signal laser light projection activation circuit 1500 can be configured to control a number of the laser light sources that are powered-on responsive to the ambient light brightness signal. Thus, more laser light sources may be turned on to project overlapping/adjacent spots and/or overlapping/adjacent lines to increase a combined brightness of the projected beams and/or reflected light to drivers.

The laser light device(s) 910 can each include a plurality of laser light sources that are spaced apart and connected to a support structure of the vehicle at different light beam output angles. The turn signal laser light projection activation circuit 1500 can be configured to supply power to individual ones of the plurality of laser light sources, and to control a rate at which individual ones of the plurality of laser light sources are repetitively cycled from off-to-on and/or cycled from on-to-off responsive to the ambient light brightness signal. The turn signal laser light projection activation circuit 1500 may be configured to decrease a length of time for which individual ones of the plurality of laser light sources are maintained on during each repetitive cycle and/or increase a length of time for which individual ones of the plurality of laser light sources are maintained off during each repetitive cycle responsive to the ambient light brightness signal indicating a decrease in brightness of the ambient light to decrease the laser light beams' brightness perceived by a driver of an adjacent vehicle, and to increase a length of time for which individual ones of the plurality of laser light sources are maintained on during each repetitive cycle and/or decrease a length of time for which individual ones of the plurality of laser light sources are maintained off during each repetitive cycle responsive to the ambient light brightness signal indicating an increase in brightness of the ambient light to increase the laser light beams' brightness perceived by a driver of an adjacent vehicle.

The turn signal laser light projection activation circuit 1500 can be configured to increase length of a visible wavelength line extending on a surface of the road surface that is created by the laser light beam(s) 910 responsive to the ambient light brightness signal indicating a decrease in brightness of the ambient light to decrease the laser light beam's brightness perceived by a driver of an adjacent vehicle, and to decrease a length of the visible wavelength line extending along a surface of the road surface that is created by the projected laser light beam(s) 910 responsive to the ambient light brightness signal indicating an increase in brightness of the ambient light to increase the laser light beam's brightness perceived by a driver of an adjacent vehicle.

The apparatus may further include an actuator (e.g., actuator 1210 of FIG. 12 and/or actuator 1210 of FIG. 11) that repetitively moves the laser light device(s) 910 (1200 of FIG. 12) and/or a mirror (e.g., mirror 1110 of FIG. 11) that reflects the projected laser light beam along a path to create a visible wavelength line extending along a surface of the road surface. The turn signal laser light projection activation circuit 1500 can be configured to control a speed at which the actuator moves the laser light device and/or the mirror responsive to the ambient light brightness signal.

Figure 15:
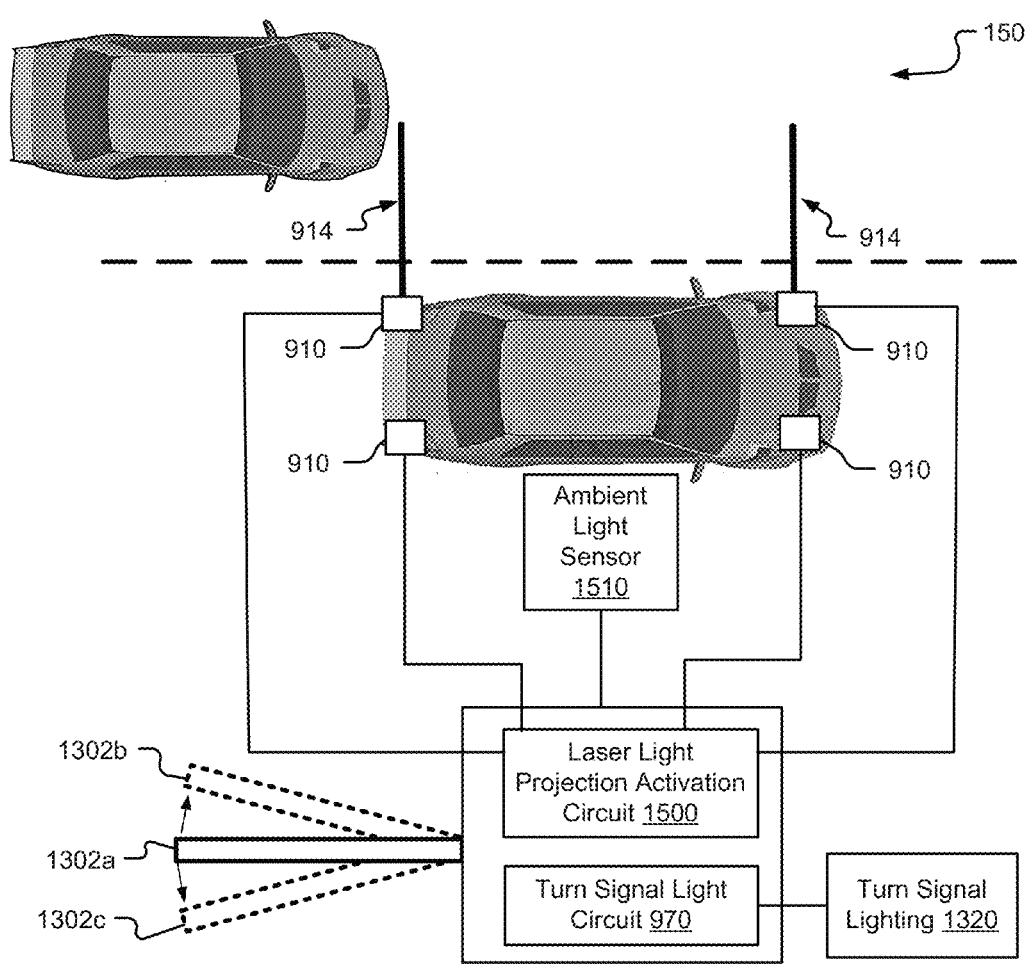
FIG. 15 is a block diagram of another vehicle turn signaling apparatus that may be configured to control the laser light device to adjust power density of the laser light beam responsive to brightness of ambient light at a location on the vehicle, in accordance with some embodiments of the present invention.

The embodiments of FIG. 15 may be combined with the embodiments of FIG. 13 and/or FIG. 14.

The turn signal laser light projection activation circuit 1500 can be configured to respond to the turn signal while the vehicle is moving faster than a first threshold speed by controlling the laser light device(s) 910 to project the laser light beam toward the road surface adjacent to the vehicle, and to respond to the turn signal while the vehicle is moving slower than a second threshold speed by controlling the laser light device(s) 910 to prevent the laser light beam from being projected toward the road surface adjacent to the vehicle.

The turn signal laser light projection activation circuit 1500 can be configured to receive an object warning signal, which indicates that an object is detected in a path of the laser light beam from the laser light device(s) 910 to the road surface adjacent to the vehicle. The turn signal laser light projection activation circuit 1500 can be configured to respond to the turn signal during absence of the object warning signal indicating an object is in the path of the laser light beam from the laser light device(s) 910 to the road surface adjacent to the vehicle, by controlling the laser light device(s) 910 (e.g., on the appropriate side of the vehicle) to project the laser light beam toward the road surface adjacent to the vehicle, respond to the turn signal while the object warning signal indicates an object is in the path of the laser light beam from the laser light device(s) 910 to the road surface adjacent to the vehicle by controlling the laser light device(s) 910 to prevent the laser light beam from being projected toward the road surface adjacent to the vehicle.

As can be appreciated, the circuitry that prevents a laser light beam from being projected from a laser light device may include a switch that is selectively closed to supply power or enable power to be supplied to the laser light device. Prevention of the laser light beam from being projected can include lowering the voltage level and/or current level supplied to the laser light device to either prevent output of a laser light beam therefrom or to constrain the laser light beam to an intensity that is not visible or may be barely visible to a person adjacent to where the beam strikes the adjacent road surface. Alternatively or additionally, a device may be provided that is controlled to allow pass through of the laser light beam or prevent pass-through by blocking the laser light beam or substantially attenuating the laser light beam through a controllable filter (e.g., mechanically actuated micro-blind apparatus that switches between open and close positions to allow pass-through of the laser light beam or block the laser light beam, a LCD or other pass through device that can be controllably darkened/lightened to selectively block and allow pass-through of the laser light beam).

In the drawings and specification, there have been disclosed embodiments of the invention and, although specific terms are employed, they are used in a generic and descriptive sense only and not for purposes of limitation, the scope of the invention being set forth in the following claims.

What is claimed:

1. A vehicle turn signaling apparatus comprising:
   a laser light device configured to project a laser light beam of visible wavelength toward a road surface adjacent to the vehicle to visibly warn other drivers where a driver of the vehicle can intend to move the vehicle;
   an ambient light sensor configured to output an ambient light brightness signal indicating brightness of ambient light at a location on the vehicle; and
   a turn signal laser light projection activation circuit that receives a turn signal which indicates that the driver intends to move the vehicle to the road surface adjacent to the vehicle, and is configured to respond to the turn signal by controlling the laser light device to project the laser light beam toward the road surface adjacent to the vehicle, and to control the laser light device to increase length of a visible wavelength line extending along the road surface that is created by the laser light beam responsive to the ambient light brightness signal indicating a decrease in brightness of the ambient light to decrease the brightness perceived by a driver of an adjacent vehicle, and to decrease length of the visible wavelength line extending along the road surface that is created by the projected laser light beam responsive to the ambient light brightness signal indicating an increase in brightness of the ambient light to increase brightness perceived by a driver of an adjacent vehicle.

2. The vehicle turn signaling apparatus of claim 1, wherein:
the turn signal laser light projection activation circuit is configured to prevent the laser light device from being powered-on while the ambient light brightness signal indicates that the brightness of the ambient light exceeds a threshold brightness level.

3. The vehicle turn signaling apparatus of claim 1, wherein:
the laser light device comprises a plurality of laser light sources; and
the turn signal laser light projection activation circuit is further configured to control a number of the laser light sources that are powered-on responsive to the ambient light brightness signal.

4. The vehicle turn signaling apparatus of claim 1, wherein:
the laser light device comprises a plurality of laser light sources that are spaced apart and connected to a support structure of the vehicle at different light beam output angles; and
the turn signal laser light projection activation circuit is further configured to supply power to individual ones of the plurality of laser light sources, and to control a rate at which individual ones of the plurality of laser light sources are repetitively cycled from off-to-on and/or cycled from on-to-off responsive to the ambient light brightness signal.

5. The vehicle turn signaling apparatus of claim 4, wherein:
the turn signal laser light projection activation circuit is further configured to decrease a length of time for which individual ones of the plurality of laser light sources are maintained on during each repetitive cycle and/or increase a length of time for which individual ones of the plurality of laser light sources are maintained off during each repetitive cycle responsive to the ambient light brightness signal indicating a decrease in brightness of the ambient light to decrease the laser light beams' brightness perceived by a driver of an adjacent vehicle, and to increase a length of time for which individual ones of the plurality of laser light sources are maintained on during each repetitive cycle and/or decrease a length of time for which individual ones of the plurality of laser light sources are maintained off during each repetitive cycle responsive to the ambient light brightness signal indicating an increase in brightness of the ambient light to increase the laser light beams' brightness perceived by a driver of an adjacent vehicle.

6. The vehicle turn signaling apparatus of claim 1, wherein the turn signal laser light projection activation circuit is further configured to:
respond to the turn signal while the vehicle is moving faster than a first threshold speed by controlling the laser light device to project the laser light beam toward the road surface adjacent to the vehicle, and
respond to the turn signal while the vehicle is moving slower than a second threshold speed by controlling the laser light device to prevent the laser light beam from being projected toward the road surface adjacent to the vehicle.

7. The vehicle turn signaling apparatus of claim 1, wherein:
the turn signal laser light projection activation circuit further receives an object warning signal, which indicates that an object is detected in a path of the laser light beam from the laser light device to the road surface adjacent to the vehicle, the turn signal laser light projection activation circuit is configured to:
respond to the turn signal during absence of the object warning signal indicating an object is in the path of the laser light beam from the laser light device to the road surface adjacent to the vehicle, by controlling the laser light device to project the laser light beam toward the road surface adjacent to the vehicle, and
respond to the turn signal while the object warning signal indicates an object is in the path of the laser light beam from the laser light device to the road surface adjacent to the vehicle by controlling the laser light device to prevent the laser light beam from being projected toward the road surface adjacent to the vehicle.

8. The vehicle turn signaling apparatus of claim 7, further comprising:
an object sensor circuit configured to output the object warning signal indicating that an object is detected in the path of the laser light beam from the laser light device to the road surface adjacent to the vehicle.

9. The vehicle turn signaling apparatus of claim 7, wherein:
the turn signal laser light projection activation circuit is further configured to respond to the turn signal and during absence of the object warning signal indicating an object is in the path of the laser light beam from the laser light device to the road surface adjacent to the vehicle while the vehicle is moving faster than a first threshold speed by controlling the laser light device to project the laser light beam toward the road surface adjacent to the vehicle,
the turn signal laser light projection activation circuit is further configured to respond to the turn signal and during absence of the object warning signal indicating an object is in the path of the laser light beam from the laser light device to the road surface adjacent to the vehicle while the vehicle is moving slower than a second threshold speed by controlling the laser light device to prevent the laser light beam from being projected toward the road surface adjacent to the vehicle, and
the turn signal laser light projection activation circuit is further configured to respond to the turn signal while the object warning signal indicates an object is in the path of the laser light beam from the laser light device to the road surface adjacent to the vehicle and while the vehicle is moving faster than the first threshold speed by controlling the laser light device to prevent the laser light beam from being projected toward the road surface adjacent to the vehicle.

10. The vehicle turn signaling apparatus of claim 1, wherein:
the turn signal laser light projection activation circuit controls length of the visible wavelength line extending along the road surface that is created by the laser light beam, responsive to the vehicle's speed.

11. The vehicle turn signaling apparatus of claim 1, further comprising:
wherein the laser light device comprises at least two of the laser light sources,
wherein one of the laser light sources is mounted to a front portion of the vehicle and configured to project a visible wavelength line on the road surface adjacent to the front of the vehicle in response to the turn signal, and
wherein another one of the laser light sources is mounted to a rear portion of the vehicle and configured to project a visible wavelength line on the road surface adjacent to the rear of the vehicle in response to the turn signal.

12. The vehicle turn signaling apparatus of claim 11, wherein:
the laser light sources are configured to project visible wavelength lines that increase in width less than one inch as they extend as continuous lines for at least one foot on the road surface adjacent to the vehicle.

13. The vehicle turn signaling apparatus of claim 11, wherein:
the laser light devices are configured to project visible wavelength lines that increase in width less than one inch as they extend as continuous lines for at least four feet on the road surface adjacent to the vehicle.

14. The vehicle turn signaling apparatus of claim 1, wherein:
the laser light device comprises a plurality of laser light sources that are spaced apart and connected to a support structure of the vehicle at different light beam output angles and that are configured to project visible wavelength lines on the road surface extending in directions away from the vehicle and spaced apart in a direction of travel of the vehicle.

15. The vehicle turn signaling apparatus of claim 14, further comprising a sequencer circuit that is configured to sequentially supply power to individual ones of the plurality of laser light sources to project a line pattern that appears to angularly sweep horizontally along a portion of the road surface.

16. The vehicle turn signaling apparatus of claim 1, wherein:
the laser light device comprises a plurality of laser light sources that are spaced apart and connected to a support structure of the vehicle at different light beam output angles and that are configured to project visible wavelength lines on the road surface extending in the direction of travel of the vehicle and spaced apart in a direction away from the vehicle.

17. The vehicle turn signaling apparatus of claim 16, further comprising a sequencer circuit that is configured to sequentially supply power to individual ones of the plurality of laser light sources to project a line pattern that appears to sweep across a portion of the road surface in the direction away from and/or toward the vehicle.

18. The vehicle turn signaling apparatus of claim 1, wherein the laser light device comprises two laser light sources each mounted to opposite sides of the vehicle; and
further comprising a turn signal stick that extends from a steering wheel column of the vehicle, wherein movement of the turn signal stick from an idle position to a first position activates one of two turn signal lights to flash light from a corresponding side of the vehicle, and movement of the turn signal stick from the first position to a second position activates one of the two laser light sources to project the visible wavelength line onto the road surface that is adjacent to the corresponding side of the vehicle.

19. A vehicle turn signaling apparatus comprising:
a laser light device configured to project a laser light beam of visible wavelength toward a road surface adjacent to the vehicle to visibly warn other drivers where a driver of the vehicle can intend to move the vehicle;
an ambient light sensor configured to output an ambient light brightness signal indicating brightness of ambient light at a location on the vehicle;
a turn signal laser light projection activation circuit that receives a turn signal which indicates that the driver intends to move the vehicle to the road surface adjacent to the vehicle, and is configured to respond to the turn signal by controlling the laser light device to project the laser light beam toward the road surface adjacent to the vehicle; and
an actuator that repetitively moves the laser light device that reflects the projected laser light beam along a path to create a visible wavelength line extending along the road surface,
wherein the turn signal laser light projection activation circuit is further configured to control a speed at which the actuator moves the laser light device responsive to the ambient light brightness signal.

20. The vehicle turn signaling apparatus of claim 6, wherein:
the first threshold speed equals the second threshold speed.

21. The vehicle turn signaling apparatus of claim 6, wherein:
at least one of the first and second threshold speeds is at least 2 miles per hour.

22. The vehicle turn signaling apparatus of claim 6, wherein:
at least one of the first and second threshold speeds is at least 5 miles per hour.

23. A vehicle turn signaling apparatus comprising:
a laser light device configured to project a laser light beam of visible wavelength toward a road surface adjacent to the vehicle to visibly warn other drivers where a driver of the vehicle can intend to move the vehicle;
an ambient light sensor configured to output an ambient light brightness signal indicating brightness of ambient light at a location on the vehicle;
a turn signal laser light projection activation circuit that receives a turn signal which indicates that the driver intends to move the vehicle to the road surface adjacent to the vehicle, and is configured to respond to the turn signal by controlling the laser light device to project the laser light beam toward the road surface adjacent to the vehicle; and
an actuator that repetitively moves a mirror that reflects the projected laser light beam along a path to create a visible wavelength line extending along the road surface,
wherein the turn signal laser light projection activation circuit is further configured to control a speed at which the actuator moves the mirror responsive to the ambient light brightness signal.

* * * * *